(12) United States Patent
Uemura

(10) Patent No.: US 7,624,275 B2
(45) Date of Patent: Nov. 24, 2009

(54) DISK DRIVE, CONTROL METHOD THEREOF AND DISK-FALSIFICATION DETECTION METHOD

(75) Inventor: Tetsuya Uemura, Saitama (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 365 days.

(21) Appl. No.: 11/145,475

(22) Filed: Jun. 3, 2005

(65) Prior Publication Data

US 2005/0270930 A1    Dec. 8, 2005

(30) Foreign Application Priority Data

Jun. 4, 2004    (JP)    ............... 2004-167457

(51) Int. Cl.
  H04L 9/32    (2006.01)
  G06F 7/04    (2006.01)
  G06F 17/30    (2006.01)
  H04N 7/16    (2006.01)
(52) U.S. Cl. ........................................ 713/176; 726/26
(58) Field of Classification Search .................. 711/112
  See application file for complete search history.

(56) References Cited

U.S. PATENT DOCUMENTS 6,636,941 B1 * 10/2003 Gold et al. ................... 711/112
2002/0034379 A1 * 3/2002 Tanaka ........................ 386/125
2002/0157044 A1 * 10/2002 Byrd ............................ 714/703
2005/0050270 A1 * 3/2005 Horn et al. ................... 711/114

FOREIGN PATENT DOCUMENTS

JP    10-283262    10/1998
JP    11-261550    9/1999

* cited by examiner

*Primary Examiner*—Brian R Peugh
*Assistant Examiner*—Gary W Cygiel
(74) *Attorney, Agent, or Firm*—Townsend and Townsend & Crew LLP; Patrick Duncan

(57) ABSTRACT

Embodiments of the invention provide a falsification detection method which is capable of recognizing the substance of a falsification, applicable to not only a specific file system, but any arbitrary application writing data with a logical stricture, usable in a standalone environment and able to prevent its performance from deteriorating even for a very large data size. In one embodiment, data stored in the storage medium employed in a disk drive is divided into meta information expressing a data structure and contents. At a step, time transients of the meta information are analyzed whereas, at other steps, time transients of the contents are analyzed. By analyzing the data at two stages in this way, replacement of a file and replacement of contents of the file can be detected whereas the substance of a falsification can be recognized in the case of a file system. By providing every block in the storage medium employed in the disk drive with a flag area that can be updated by the disk drive but only referred to by a host, a falsification can be detected even if the falsification results from a write operation carried out by using an illegal access path.

10 Claims, 19 Drawing Sheets

2100

| FLAG | OP TYPE | TIMESTAMP | BLOCKS | REMARK |
|---|---|---|---|---|
| 013025 | CREATE | 2003/10/25 09:00 | 204 | new file |
| 013051 | RENAME | 2003/10/25 09:00 | 204 | DST foo.c~ |
| 013066 | CREATE | 2003/10/25 10:17 | 251 | |
| 013097 | UPDATE | 2003/10/25 10:23 | 251, 516 | ADD BLK |
| 013102 | UPDATE | 2003/10/25 10:23 | 251, 516 | MOD ATTR |
| 013286 | UPDATE | 2003/10/26 21:18 | 251, 516, 538 | ADD BLK |
| 014233 | REMOVE | 2003/10/26 21:18 | 251, 516, 538 | |
| 014234 | RENAME | 2003/10/26 21:18 | 621, 622, 623, 624, 625 | SRC baz.c |
| 014769 | UPDATE | 2003/10/26 21:18 | 621, 622, 961, 624, 625 | MOD BLK |

Columns: 2101, 2102, 2103, 2104, 2105
Rows: 2111–2119

Fig.1

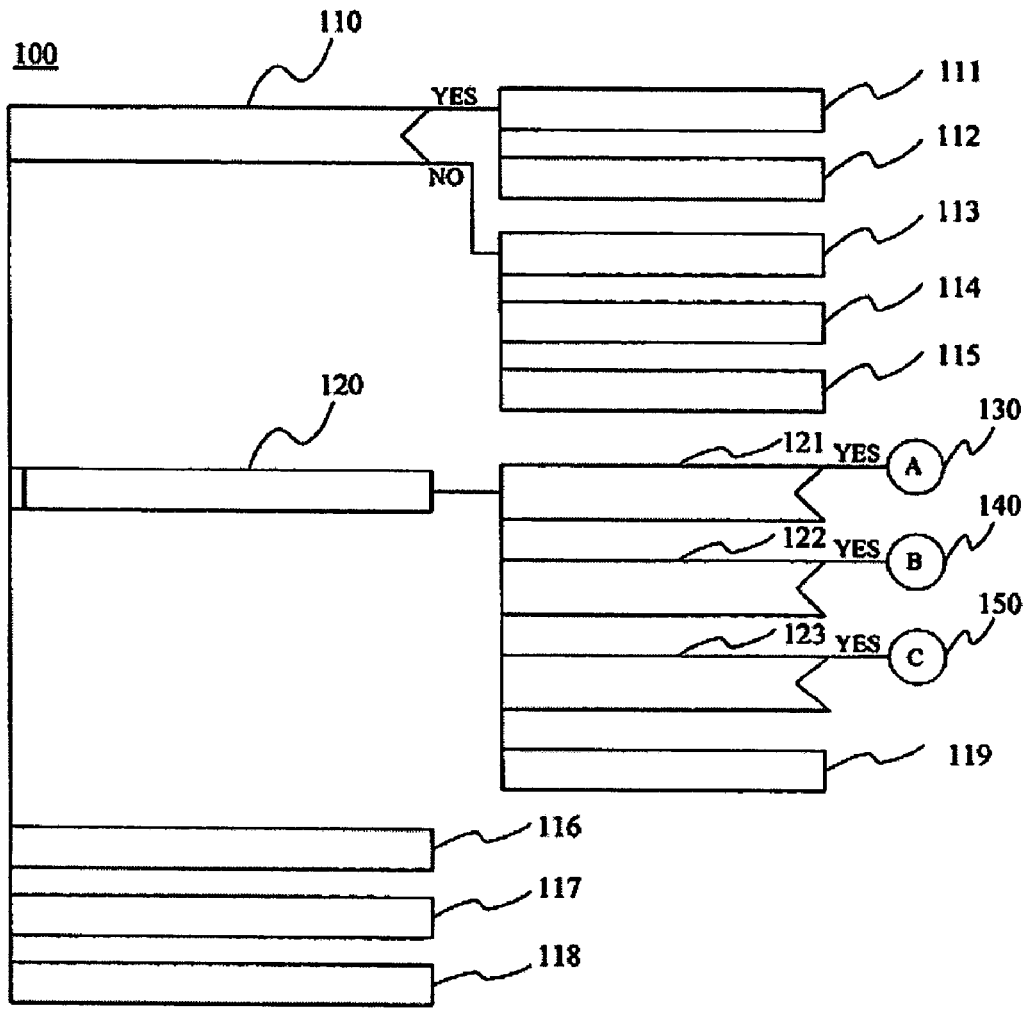

Fig. 1
- 110: Check whether there is result of previous analysis
- 111: Fetch result of previous analysis
- 112: Fetch analysis resumption information
- 113: Fetch logical structure of data
- 114: Set analysis program
- 115: Seek for beginning of storage medium
- 116: Allocate location for storing analysis result
- 117: Write analysis result
- 118: Write analysis resumption information
- 119: Record error
- 120: Execute loop in range of PBAs completing write operation
- 121: Confirm directory operation
- 122: Confirm file operation
- 123: Confirm block operation

Fig.2

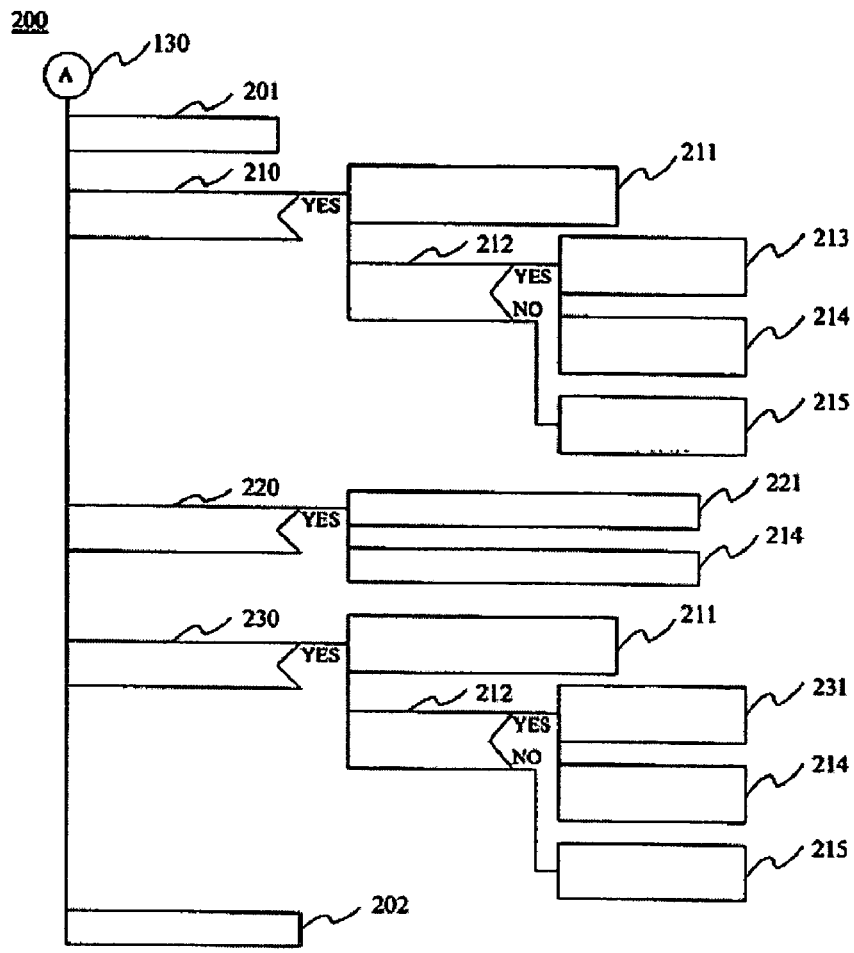

Fig. 2
201: Compare with pre-updating state
210: Confirm file creation
211: Search for same file name existing in the past
212: Determine whether same file name exists
213: Add file entry
214: Add reference remark indicating opposite direction in file entry
215: Create new file entry
220: Confirm file deletion
221: Add file-deletion file entry
214: Add reference remark indicating opposite direction to file entry
230: Confirm file-name change
211: Search for same file name existing in the past
212: Determine whether same file name exists
231: Add file entry of file-name modification to repository.
214: Add reference remark indicating opposite direction to file entry
215: Create new file entry
202: Seek for next block

Fig.3

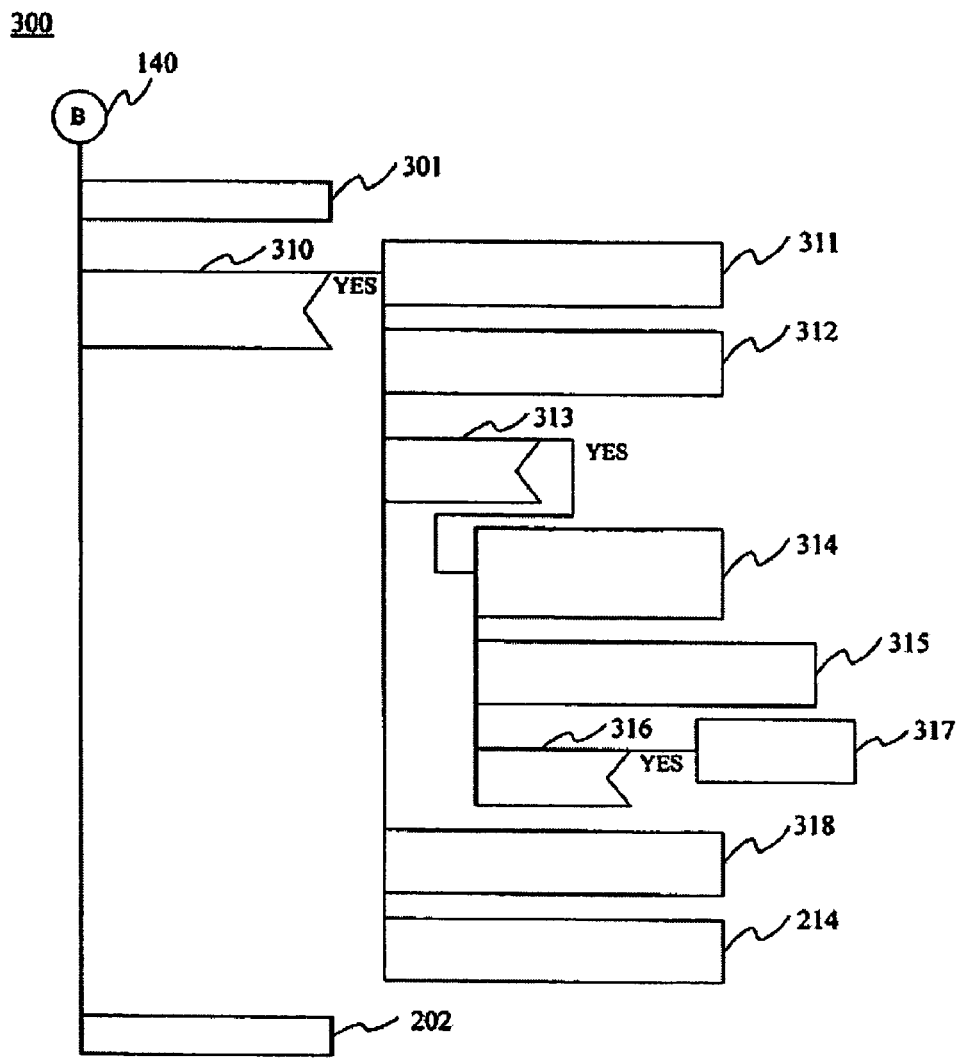

Fig. 3
301: Compare with pre-updating state
310: Confirm updating of file meta information
311: Add meta-information-updating file entry to repository
312: Search LBA state transition repository for LBA in meta information
313: Determine whether such LBA was found in repository
314: Move LBA block entry to LBA state transition repository for blocks in file entries
315: Search moved LBA block entry for LBA of block for storing file tail
316: Confirm existence of file-tail LBA
317: Add consistency flag
318: Check consistency between meta information and information in flag area
214: Add reference remark indicating opposite direction to file entry
202: Seek for next block

Fig.4

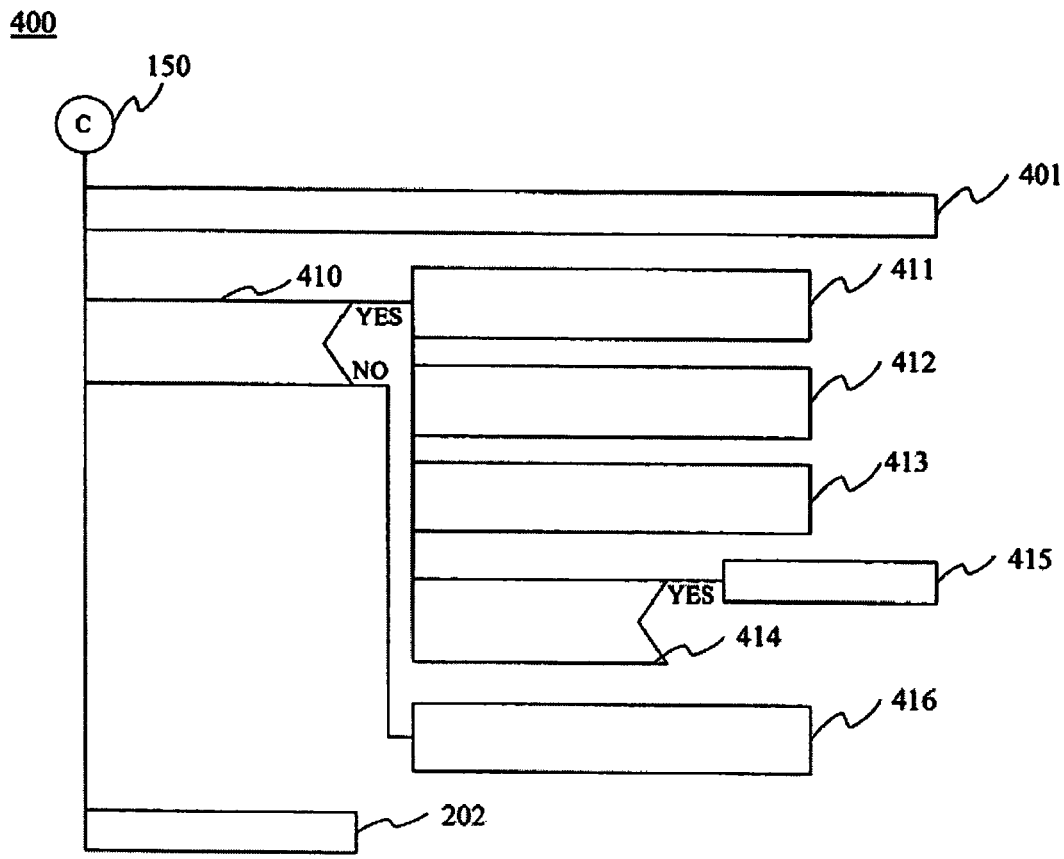

Fig. 4
401: Search LBA state transition repository for LBA of object-analysis block
410: Determine whether such LBA was found in repository
411: Add information to LBA state transition repository
412: Check consistency between meta information and information in the flag area
413: Add reference remark indicating opposite direction to LBA block entry
414: Confirm LBA of last block of a file
415: Add consistency flag
416: Add new entry to LBA state transition repository for managing only LBAs of blocks in unidentifiable file
202: Seek for next block

Fig.5

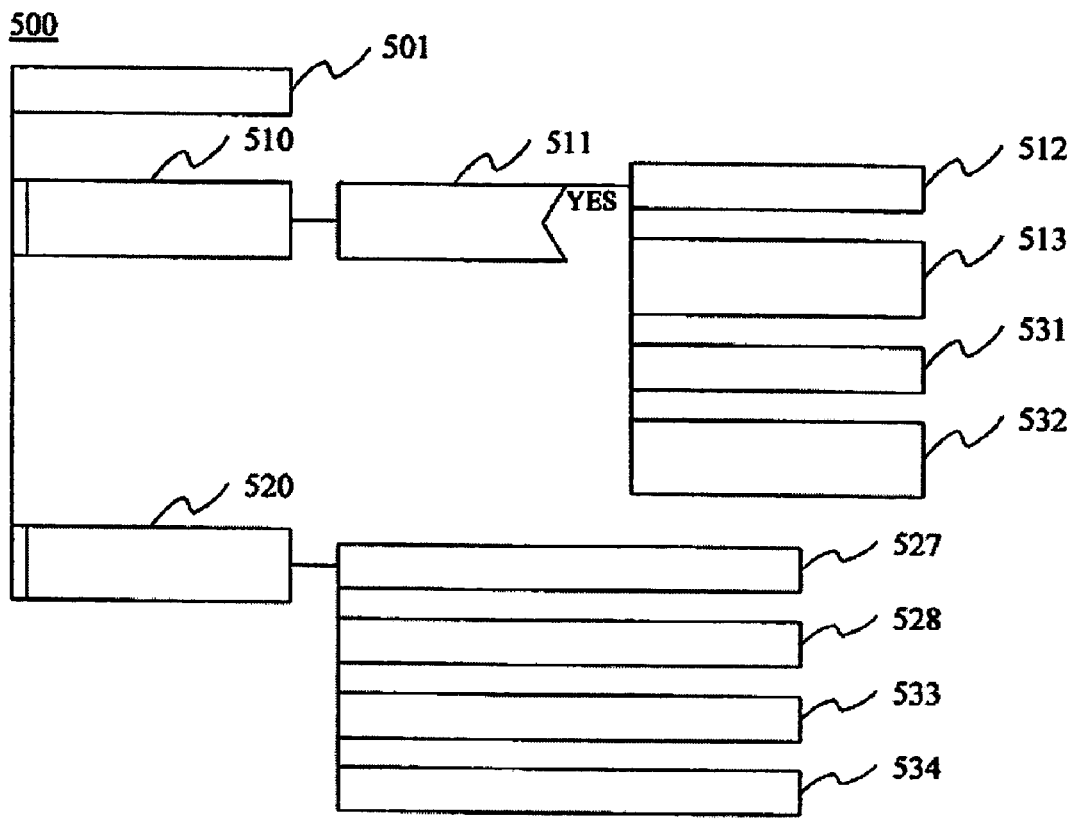

Fig. 5
501: Specify path name
510: Execute loop in reversed order through history of operations to update meta information
511: Determine whether path name is specified path name
512: Fetch operation substance
513: Output fetched operation substance to console
520: Execute loop through fetched operation substances
527: Extract file-level difference
528: Output file difference to console
531:   Fetch consistency
532:   Output consistency to console
533:   Fetch consistency
534:   Output consistency to console

Fig.11

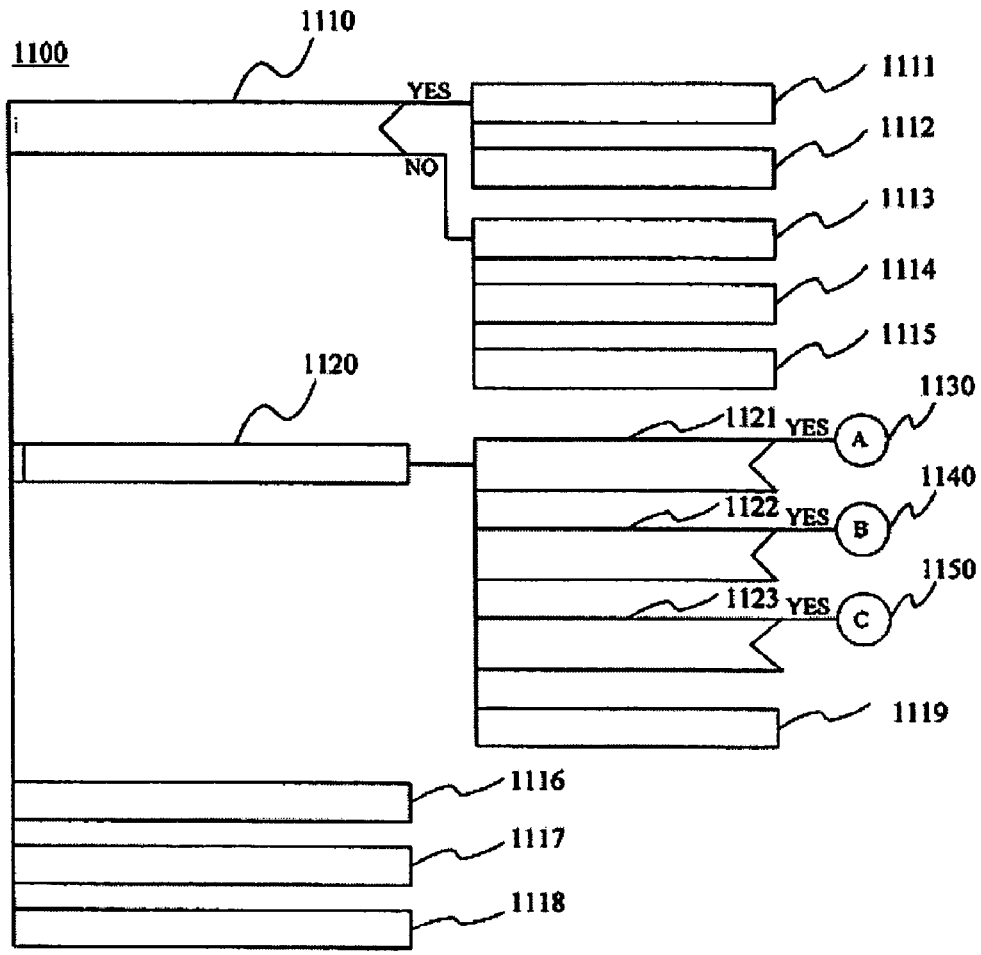

Fig. 11
1110: Check whether there is result of previous analysis
1111: Fetch result of previous analysis
1112: Fetch analysis resumption information
1113: Fetch logical structure of data
1114: Set analysis program
1115: Seek for beginning of storage medium
1116: Allocate location for storing analysis result
1117: Write analysis result
1118: Write analysis resumption information
1119: Record error
1120: Execute loop in range of PBAs completing write operation
1121: Confirm directory operation
1122: Confirm file operation
1123: Confirm block operation

Fig.12

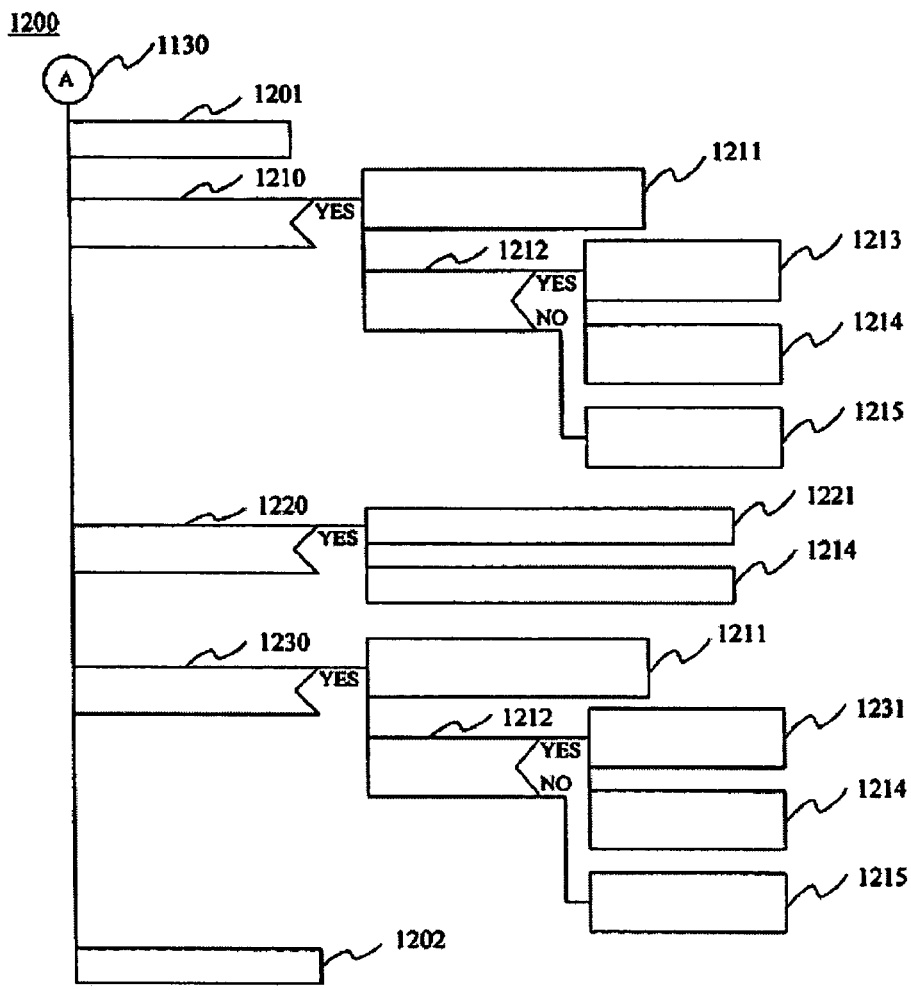

Fig. 12
1201: Compare with pre-updating state
1210: Confirm file creation
1211: Search for same file name existing in the past
1212: Determine whether same file name exists
1213: Add file entry
1214: Add reference remark indicating opposite direction to file entry
1215: Create new file entry
1220: Confirm file deletion
1221: Add file-deletion file entry
1214: Add reference remark indicating opposite direction to file entry
1230: Confirm file-name change
1211: Search for same file name existing in the past
1212: Determine whether same file name exists
1231: Add file entry of file-name modification to repository
1214: Add reference remark indicating opposite direction to file entry
1215: Create new file entry
1202: Seek for next block

Fig.13

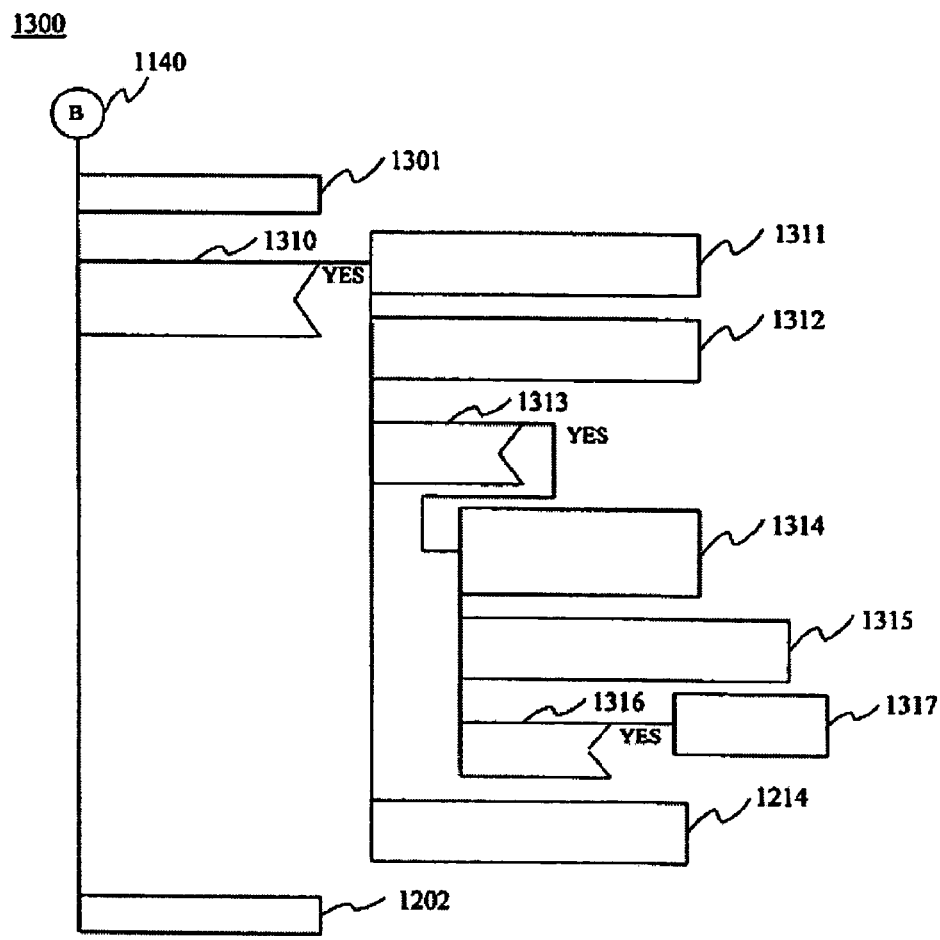

Fig. 13
1301: Compare with pre-updating state
1310: Confirm updating of file meta information
1311: Add meta-information-updating file entry to repository
1312: Search LBA state transition repository for LBA in meta information
1313: Determine whether such LBA was found in repository
1314: Move LBA block entry to LBA state transition repository for blocks in file entries
1315: Search moved LBA block entry for LBA of block for storing file tail
1316: Confirm existence of file-tail LBA
1317: Add consistency flag
1214: Add reference remark indicating opposite direction to file entry
1202: Seek for next block

Fig.14

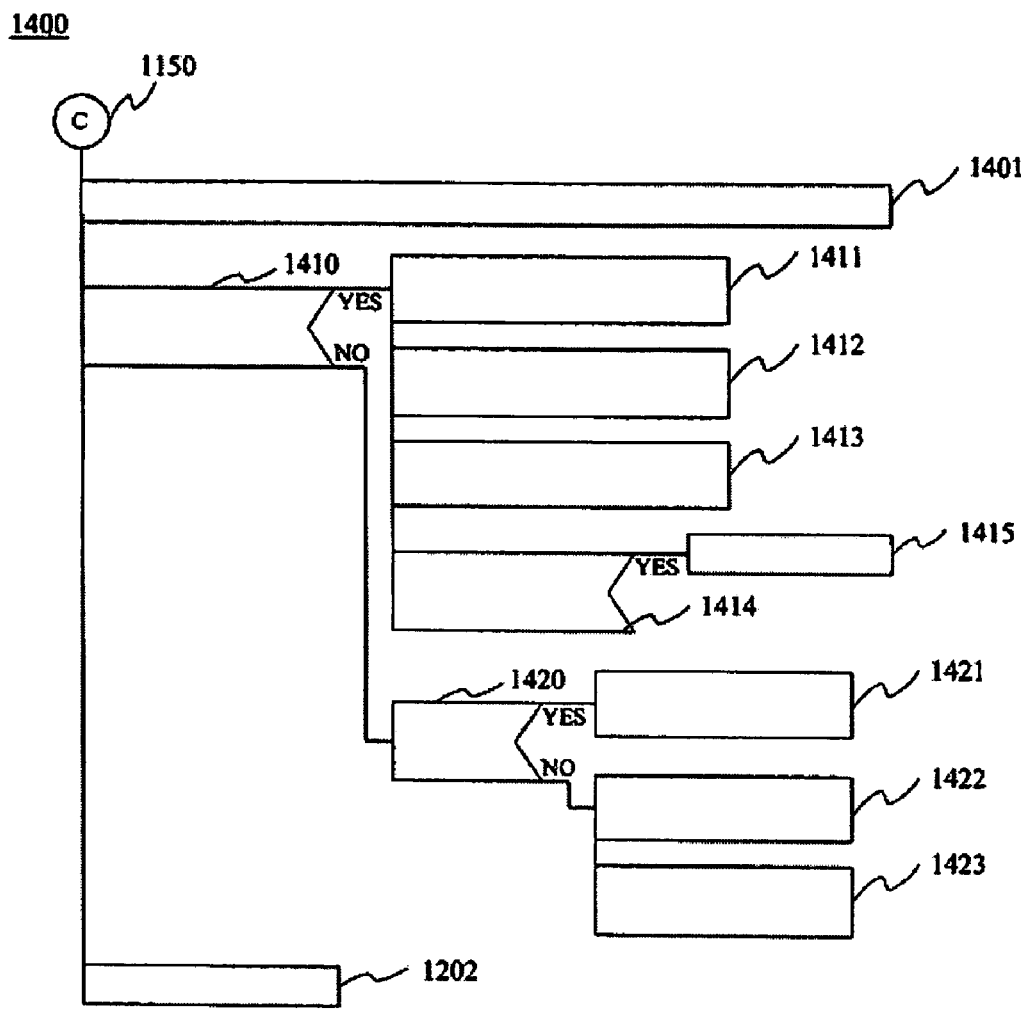

Fig. 14
1401: Search LBA state transition repository for LBA of object-analysis block
1410: Determine whether such LBA was found in repository
1411: Add information to LBA state transition repository
1412: Add reference remark indicating opposite direction to LBA block entry
1413: Add file identifier to block flag
1414: Confirm LBA of last block of a file
1415: Add consistency flag
1420: New LBA?
1421: Create new LBA block entry in LBA state transition repository
1422: Add information to LBA block entry
1423: Add reference remark indicating opposite direction to LBA block entry
1202: Seek for next block

Fig.15

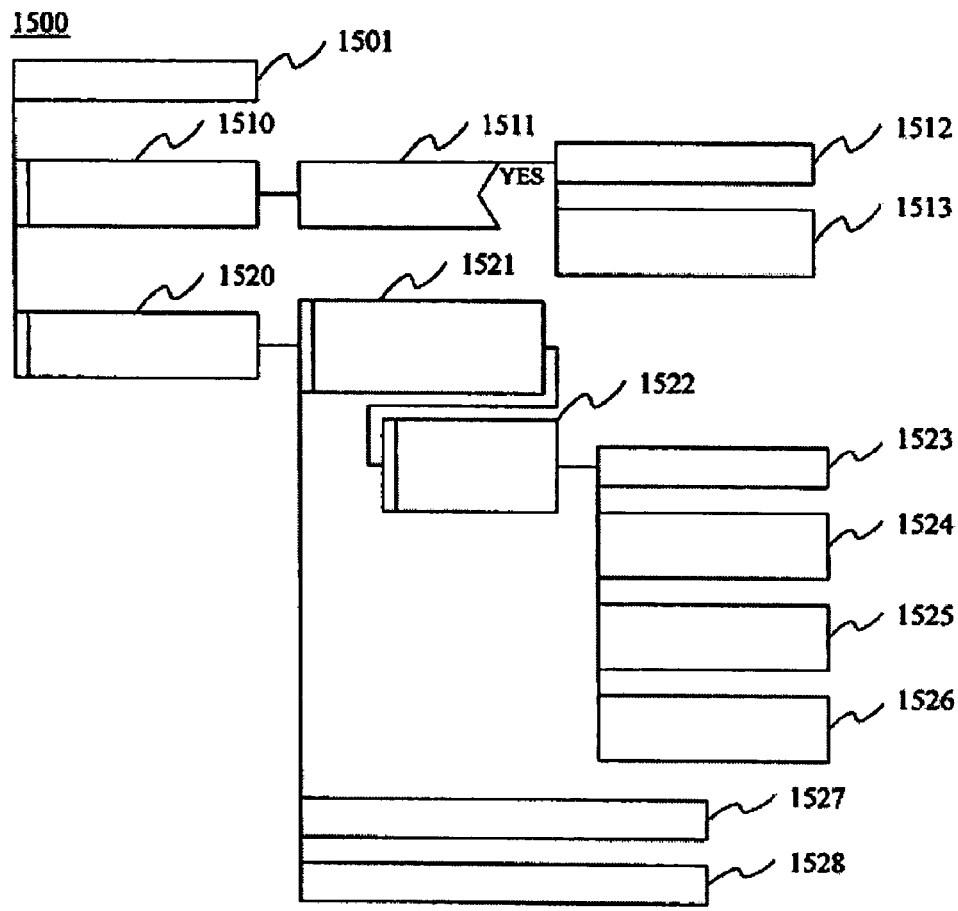

Fig. 15
1501: Specify path name.
1510: Execute loop in reversed order through history of operations to update meta information
1511: Determine whether path name is specified path name
1512: Fetch operation substance
1513: Output fetched operation substance to console
1520: Execute loop through fetched operation substances
1521: Execute loop for blocks of file specified by file entry
1522: Execute loop in reversed order on blocks having same LBA
1523: Read out block contents from storage medium
1524: Read out block contents stored previously at same LBA
1525: Extract difference in contents between two blocks
1526: Output difference in contents to console
1527: Extract file-level difference
1528: Output file difference to console

Fig.20

| | 2000 | 2001 | 2002 | 2003 | 2004 | 2005 | 2006 | 2007 | |
|---|---|---|---|---|---|---|---|---|---|
| | FLAG | DIR | NAME | TYPE | OP TYPE | INODE | REMARK | | |
| 2011 | 013025 | /src | foo.c | FILE | CREATE | 10 | new file | | |
| 2012 | 013051 | /src | foo.c~ | FILE | RENAME | 10 | SRC foo.c | | |
| 2013 | 013066 | /src | foo.c | FILE | CREATE | 17 | | | |
| 2014 | 013121 | /src | bar | DIR | CREATE | 25 | new dir | | |
| 2015 | 013180 | /src | foo.c~ | FILE | REMOVE | 10 | | | |
| | ⋮ | ⋮ | ⋮ | ⋮ | ⋮ | ⋮ | ⋮ | | |
| 2016 | 014233 | /src | foo.c | FILE | REMOVE | 17 | | | |
| 2017 | 014234 | /src | foo.c | FILE | CREATE | 263 | | | |

Fig.21

| | 2100 / 2101 | 2102 | 2103 | 2104 | 2105 | |
|---|---|---|---|---|---|---|
| | FLAG | OP TYPE | TIMESTAMP | BLOCKS | REMARK | |
| 2111 | 013025 | CREATE | 2003/10/25 09:00 | 204 | new file | |
| 2112 | 013051 | RENAME | 2003/10/25 09:00 | 204 | DST foo.c~ | |
| 2113 | 013066 | CREATE | 2003/10/25 10:17 | 251 | | |
| 2114 | 013097 | UPDATE | 2003/10/25 10:23 | 251, 516 | ADD BLK | |
| 2115 | 013102 | UPDATE | 2003/10/25 10:23 | 251, 516 | MOD ATTR | |
| 2116 | 013286 | UPDATE | 2003/10/26 21:18 | 251, 516, 538 | ADD BLK | |
| 2117 | 014233 | REMOVE | 2003/10/26 21:18 | 251, 516, 538 | | |
| 2118 | 014234 | RENAME | 2003/10/26 21:18 | 621, 622, 623, 624, 625 | SRC baz.c | |
| 2119 | 014769 | UPDATE | 2003/10/26 21:18 | 621, 622, 961, 624, 625 | MOD BLK | |

| BLK | LBA (FLAG) |
|---|---|
| 204 | 816 (013000), 817 (013001), 818 (013002), 819 (013003) |
| 251 | 1004 (013029), 1005 (013030), 1006 (013031), 1007 (013032) |
| 516 | 2064 (013076), 2065 (013077), 2066 (013078), 2067 (013079) |
| 538 | 2152 (013269), 2153 (013270), 2154 (013271), 2155 (013272) |
| 621 | 2484 (013782), 2485 (013783), 2486 (013784), 2487 (013785) |
| 622 | 2488 (013786), 2489 (013787), 2490 (013788), 2491 (013789) |
| 623 | 2492 (013790), 2493 (013791), 2494 (013792), 2495 (013793) |
| 624 | 2496 (013794), 2497 (013795), 2498 (013796), 2499 (013797) |
| 625 | 2500 (013798), 2501 (013799), 2502 (013800), 2503 (013801) |
| 961 | 3076 (014585), 3077 (014586), 3078 (019756), 3079 (014588) |

DISK DRIVE, CONTROL METHOD THEREOF AND DISK-FALSIFICATION DETECTION METHOD

CROSS-REFERENCES TO RELATED APPLICATIONS

This application claims priority from Japanese Patent Application No. JP2004-167457, filed Jun. 4, 2004, the entire disclosure of which is incorporated herein by reference.

BACKGROUND OF THE INVENTION

The present invention relates to a disk drive, a method for controlling the disk drive and a falsification detection method. More particularly, the present invention relates to a method for controlling a disk drive having a flag area that can be only referred to by a host but not written thereby and relates to a falsification detection method for detecting a falsification of data, which has been recorded by the disk drive on the storage medium employed in the disk drive, by making a 2-stage analysis, i.e., an analysis of a time transient of meta data and an analysis of a time transient of contents.

With popularization of various kinds of application software, there is also progress in efforts to convert documents prepared by the user into electronic data. Unlike a document written on a piece of paper, electronic data can be changed with ease. Thus, by carrying forward the efforts to convert documents into electronic data, improvement of the work efficiency can be expected. In order to use electronic data as evidence in typically a judicial trial, however, it is required that the time to make the electronic data and the contents of the electronic data are not falsified. For this reason, the faultlessness of the electronic data must be verified or, if the electronic data has been falsified, the falsification must be detected.

The conventional detection of electronic data recorded by a disk drive on a storage medium mounted thereon can be divided into two large categories as follows:
(1) a method for generating falsification detection information inside the disk drive, and
(2) a method to generate falsification detection information by using information external to the disk drive.

As the first method, a file system and a program storage medium have been proposed and disclosed in Japanese Patent Laid-open No. 10-283262 and as the second method, a system and method for preventing falsification of electronic texts' have been proposed and disclosed in Japanese Patent Laid-open No. 11-261550.

Japanese Patent Laid-open No. 10-283262 has proposed a new file system capable of determining whether or not a file has been falsified. When a new file is generated, an authentication file is also created. The authentication file includes a checksum of the new file, its creation date and information on the creator thereof. By using this new file system, every time a file recorded on a storage medium in a disk drive is updated through an operation carried out by a host to write data onto the storage medium, a post-updating checksum and an updating date are added to the authentication file. Thus, it is possible to determine whether or not the file has been falsified.

In Japanese Patent Laid-open No. 11-261550, a method has been proposed as a falsification detection method allowing an outside authenticator to create authentication data of an electronic text. In accordance with this method, first of all, a central player extracts characteristic data representing characteristics of an electronic text and encrypts the characteristic data by using a first encryption key. Then, the outside authenticator adds external authentication data including at least a date to the encrypted characteristic data and further encrypts the characteristic data by using a second encryption key to produce authentication data of the electronic text. The central player is not capable of creating the authentication data. Thus, by comparing the electronic text with the authentication data, it is possible to determine whether or not the electronic text has been falsified.

BRIEF SUMMARY OF THE INVENTION

A falsification detection method using a checksum and extracting characteristics on the basis of this file system has the following problems.

First of all, the method disclosed in Japanese Patent Laid-open No. 10-283262 has the following problems:
(1) The proposed new file system cannot be applied to an existing file system.
(2) The method can be used for determining whether or not a file has been falsified, but cannot be used for recognizing a file portion that has been falsified and the substance of the falsification.
(3) In an operation to edit an original file by using an application in which the original file is saved as a backup file with a different file name and a post-updating file is created as a new file, information on updating is not left in an authentication file.
(4) In the case of a file with a size increasing periodically as is the case with an access log or the like, as the size of the file increases, the time it takes to generate a checksum also becomes longer and the size of an auxiliary file for storing data including the checksum also rises as well.
(5) If a file is falsified by a person in charge of file management with an authority to change the present time measured by a computer or a person in charge of file management with an authority to manage authentication files, it will be impossible to detect the falsification.
(6) If a file is falsified by providing an authentication file with consistency with a file on a storage medium in a disk drive through an irregular access path for writing data into the file by issuing a direct command to a block device instead of using a regular access path for writing data into the file through a file system, it will be impossible to detect the falsification.
(7) The method cannot be applied to an application, which makes a direct access to a block device as is the case with a database.

On the other hand, the method disclosed in Japanese Patent Laid-open No. 11-261550 has the following problems:
(1) The method can be used for determining whether or not a file has been falsified, but cannot be used for recognizing a file portion that has been falsified and the substance of the falsification.
(2) The method cannot be adopted in an environment, which is isolated from a network so that communications with an outside authenticator are impossible.
(3) In the case of a file with a size increasing periodically as is the case with an access log or the like, as the size of the file increases and the load of authentication processing also becomes heavier as well.
(4) The method cannot be applied to an application, which makes a direct access to a block device as is the case with a database.

It is thus a feature of the present invention to provide a method for controlling a disk drive by creating a flag area that can be only referred to by a host but not updated thereby for every smallest write unit of a recording medium in the disk drive.

It is another feature of the present invention to provide a falsification detection method for detecting a falsification of data recorded on a storage medium in a disk drive for recording new data into a free area on the storage medium so as to prevent existing data from being overwritten by the new data by making an analysis of a time transient of meta information and an analysis of a time transient of contents specified by the meta information at every stage of the time transient of the meta information.

It is another feature of the present invention to provide a falsification detection method capable of referring to a result of falsification detection in both the forward and opposite directions of the time axis.

It is another feature of the present invention to provide a falsification detection method capable of suspending and resuming a process to detect a falsification.

It is another feature of the present invention to provide a meta falsification detection method capable of writing an identifier of contents into a flag area of a storage medium for recording the contents.

It is another feature of the present invention to provide a falsification detection method capable of recording a check point into a flag area for an address on a storage medium for recording meta information and contents with consistency.

It is another feature of the present invention to provide a falsification detection method capable of determining whether or not contents identified by a specified identifier has been falsified.

It is another feature of the present invention to provide a falsification detection method capable of outputting a difference between contents after being falsified and the contents before being falsified.

It is another feature of the present invention to provide a falsification detection method capable of invalidating falsified data.

It is another feature of the present invention to provide a falsification detection method capable of checking information in a flag area included into the storage medium mounted in a disk drive as an area that can be only referred to by a host but not updated thereby and capable of checking consistency between a time transient of meta information and a time transient of contents.

In specific embodiments of the present invention, the disk drive, the disk-drive control method and the falsification detection method include the components or aspects as below.

A control unit executes the steps of: providing a flag area for each unit of writing data into the storage medium employed in the disk drive as an area, which a host is capable of only referring to but only the control unit is capable of writing information into; generating information based on internal information of the disk drive; and writing the generated information into the flag area.

The control unit further executes the steps of: receiving a write command from the host; generating information based on internal information; and generating information, which changes to accompany execution of the write command.

The control unit further executes the steps of: receiving a read command from the host; generating information based on internal information; and generating information, which changes to accompany execution of the read command.

The information, which changes to accompany execution of the write command, is a total operating time of the disk drive, the total number of write commands issued to the disk drive or a write-command count computed for every unit of writing data onto the storage medium.

The control unit employed in the disk drive, a first host writing data onto a storage medium employed in the disk drive, a second host writing no data onto the storage medium employed in the disk drive or a management console of the disk drive executes the steps of: setting a logical structure of data recorded onto the storage medium employed in the disk drive; identifying a record of meta information used as information of the set logical structure of the data among pieces of data recorded on the storage medium employed in the disk drive on the basis of the logical structure; analyzing a time transient of the identified meta information from an initial state of the meta information to a most recent state of the meta information; and analyzing a time transient of contents of data specified by the meta information as a time transient from an initial state of the contents to a most recent state of the contents at every stage in the analyzed time transient of the meta information.

From the result of analyzing the time transient of the meta information, the control unit further executes the step of generating a time transient of the meta information in the opposite direction from the most recent state to the initial state and, from the result of analyzing the time transient of the contents, the control unit further executes the step of generating a time transient of the contents in the opposite direction from the most recent state to the initial state.

The control unit further executes the steps of:

allocating an area for saving an analysis result;

saving the present state of an analysis process in the allocated area;

checking the allocated area for data saved therein at the start of a falsification detection process and reading out the state of an analysis process in a case where the state has been saved in the area; and starting an analysis process as a continuation of an immediately preceding analysis process from the last state of the preceding analysis process in a case where the last state of the preceding analysis process has been read out from the area or starting an analysis process all over from the beginning if no state of the analysis process has been read out from the area.

The control unit further executes the step of recording an identifier of contents into a flag area, which is provided on the storage medium for every smallest management unit, for a recording area included in the storage medium as an area in which contents of data specified by meta information are recorded by the disk drive.

The control unit further executes the steps of: identifying an address on the storage medium employed in the disk drive as an address, at which meta information and contents have been recorded by maintaining consistency between the meta information and the contents, from a result of analyzing a time transient of the meta information and a result of analyzing a time transient of the contents; and recording a check point, which shows that the meta information and the contents have been recorded by maintaining consistency, in the flag area corresponding to the specified address on the storage medium.

The control unit further executes the steps of:

receiving an identifier entered by the user via a console as the identifier of contents;

searching a result of analyzing a time transient of meta information for the identifier and determining whether or not the contents have been replaced;

outputting information indicating the event of content replacement on the console in a case where the contents have been replaced;

searching a result of analyzing a time transient of the contents for the identifier and determining whether or not the contents have been renewed; and outputting information indicating the event of content renewal on the console in a case where the contents have been renewed.

The control unit further executes the steps of: receiving two arbitrary events entered to the console as events selected among pieces of information each output to the console to indicate the event of content replacement or pieces of information each output to the console to indicate the event of content renewal; computing a difference between meta information requested by one of the received events and meta information requested by the other received event and outputting the difference to the console; and computing a difference between contents requested by one of the received events and contents requested by the other received event and outputting the difference to the console.

The control unit further executes the steps of: receiving an arbitrary event entered to the console as an event selected among pieces of information each output to the console to indicate the event of content replacement or pieces of information each output to the console to indicate the event of content replacement; and invalidating contents requested by the received event.

The control unit further executes the step of invalidating meta information and contents, which have the same identifier as a content identifier requested by a received event and have been recorded on the storage medium employed in the disk drive at and after a point of time the received event was generated.

The control unit further executes the step of invalidating all pieces of meta information and all contents, which have been recorded on the storage medium employed in the disk drive at and after a point of time the received event was generated.

The control unit further executes the steps of: checking consistency between a result of analyzing a time transient of meta information and information stored in the flag area; and checking consistency between a result of analyzing a time transient of contents and information stored in the flag area.

The control unit further executes the step of periodically scanning the storage medium and uses information read out at the scanning step as information based on internal information of the disk drive.

A disk drive including a storage medium and a control unit for exchanging a command and data with a host and executing control of operations to write data onto the storage medium in accordance with the command received from the host as well as control of operations to read out data from the storage medium in accordance with the command received from the host comprises: a flag-area generation module for providing a flag area, which the host is capable of only referring to but only the disk drive is capable of writing information into, for every unit of an operation to write data into the storage medium; an internal-state information generation module for generating internal-state information based on an internal state of the disk drive; and an internal-state information write module for writing internal-state information generated by the internal-state information generation module into the flag area provided by the flag-area generation module.

The internal-state information generation module uses a state, which changes to accompany execution of a write command, and a state, which changes to accompany execution of a read command, as the internal state. The state, which changes to accompany execution of a write command, includes the total operating time of the disk drive, the number of write commands issued to the disk drive or a write-command count computed for every unit of the operation to write data into the storage medium.

The disk drive further includes a scan mechanism for periodically scanning the storage medium and the internal-state information generation module uses a state changed by the scan mechanism as the internal state.

The present invention exhibits the following effects. Since an external recognition mechanism is not required, the present invention has the effect of an ability to detect a falsification even in a standalone environment.

Since a falsification can be detected by merely reading out data of a management information portion from the storage medium employed in the disk drive, the present invention has the effect of an ability to shorten the time it takes to detect a falsification by a quantity proportional to a decrease in amount of data to be read out.

Since a function to suspend and resume a process to detect a falsification makes it unnecessary to repeat the falsification detection process for an area, in which a falsification has been detected, the present invention has the effect of an ability to increase the speed of the process.

In the case of a file that has been falsified, the present invention has the effect of an ability to confirm the existence of the falsification through examination of a falsification point by tracing back from the most recent state to a preceding state.

Data may have been written into a file in the storage medium employed in the disk drive by issuing a command for a block device directly from the host without going through a file system. By tracing a history of operations to write data into blocks for recording the contents of the file, nevertheless, the present invention has the effect of an ability to detect a falsification of the file even if data has been written into the file by issuing a direct command in such a way.

The present invention also has the effect of an ability to apply the detection of a falsification to any applications other than the file system as long as the applications each write data onto a storage medium employed in the disk drive as data having a logical structure.

By referring to operations recorded in a history of directory operations before referring to a history of file operations, the present invention can exhibit an ability to trace updated contents of a file even if the file has been replaced.

The present invention also has the effect of an ability to restore the pre-falsification state of the disk drive and sustain consistency of the file system through invalidation of data of a minimum possible amount by identification of a condition in which consistency of the file system is established in a pre-falsification state of the disk drive.

BRIEF DESCRIPTION OF THE DRAWINGS

FIG. 1 is a PAD diagram referred to in explaining a method of tracing a history of write operations carried out in accordance with a first embodiment of the present invention.

FIG. 2 is a PAD diagram referred to in explaining a subroutine 130 according to the first embodiment of the present invention.

FIG. 3 is a PAD diagram referred to in explaining a subroutine 140 according to the first embodiment of the present invention.

FIG. 4 is a PAD diagram referred to in explaining a subroutine 150 according to the first embodiment of the present invention.

FIG. 5 is a PAD diagram referred to in explaining a method according to the first embodiment of the present invention as a method of detecting a falsification of a file.

FIG. 11 is a PAD diagram referred to in explaining a method of tracing a history of write operations in accordance with a second embodiment of the present invention.

FIG. 12 is a PAD diagram referred to in explaining a subroutine 1130 according to the second embodiment of the present invention.

FIG. 13 is a PAD diagram referred to in explaining a subroutine 1140 according to the second embodiment of the present invention.

FIG. 14 is a PAD diagram referred to in explaining a subroutine 1150 according to the second embodiment of the present invention.

FIG. 15 is a PAD diagram referred to in explaining a method according to the second embodiment of the present invention as a method of detecting a falsification of a file.

FIG. 20 is a diagram showing the data structure of a directory state transition repository according to the first embodiment of the present invention.

FIG. 21 is a diagram showing the data structure of a file state transition repository according to the first embodiment of the present invention.

DETAILED DESCRIPTION OF THE INVENTION

Figure 6:
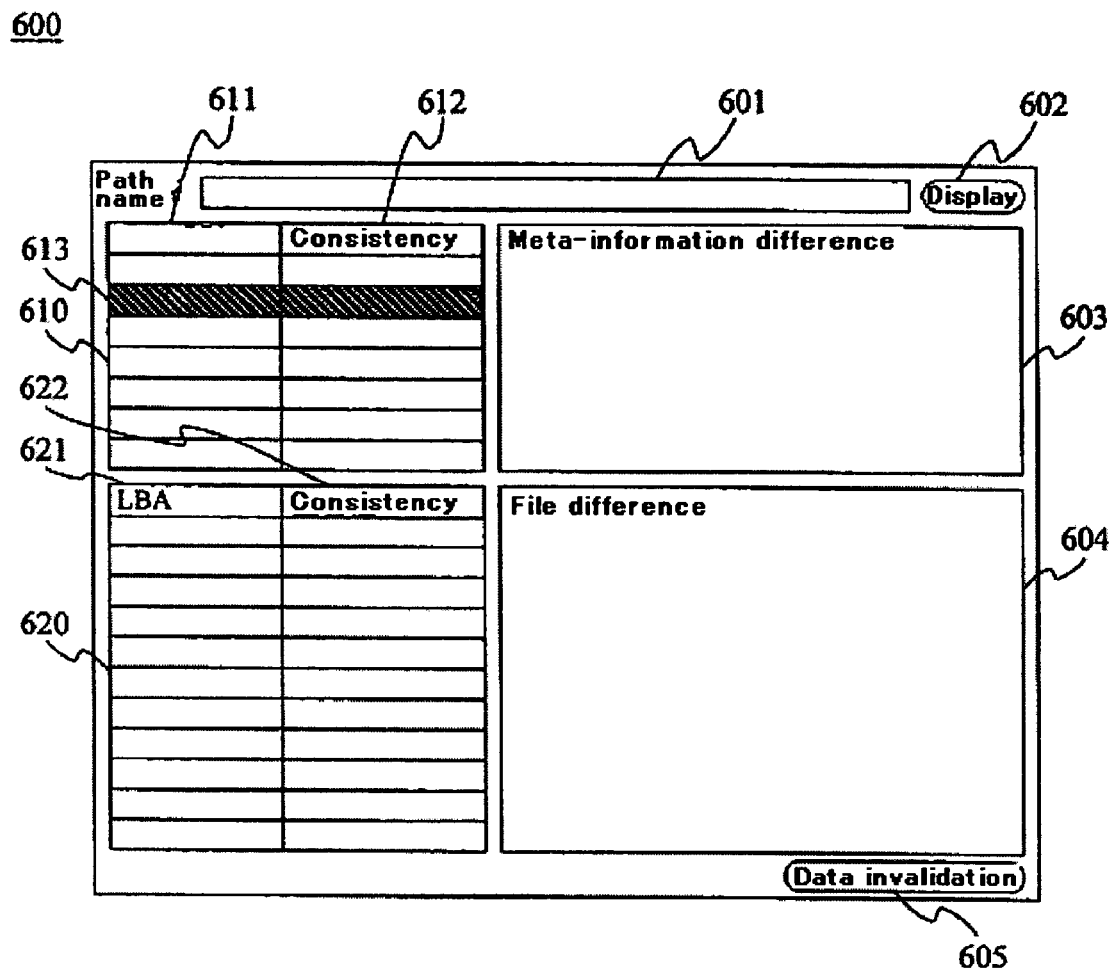
FIG. 6 is a diagram showing a screen appearing on a display unit of a console as a screen according to the first embodiment of the present invention.

Embodiments of the present invention will be described with reference to the drawings below. It is to be noted that the same configuration elements are denoted by the same reference numeral through out the description.

First Embodiment

FIG. 1 is a PAD diagram referred to in explaining a method of tracing a history of write operations carried out in accordance with a first embodiment of the present invention. In FIG. 1, reference numeral 100 denotes the PAD diagram referred to in explaining the method of tracing a history of write operations carried out by the first embodiment implementing a falsification detection method provided by the present invention. Reference numeral 110 denotes the step of checking whether or not there is a result of an analysis made previously. Reference numeral 111 denotes the step of fetching the result of an analysis made previously. Reference numeral 112 denotes the step of fetching analysis resumption information required for starting an analysis as a continuation of the immediately preceding analysis. Reference numeral 113 denotes the step of fetching the logical structure of data recorded on the storage medium employed in the disk drive. Reference numeral 114 denotes the step of setting an analysis program for tracing a history of write operations. Reference numeral 115 denotes the step of seeking the storage medium employed in the disk drive for the beginning of the storage medium. Reference numeral 116 denotes the step of allocating a location for storing a result of an analysis. Reference numeral 117 denotes the step of writing a result of an analysis. Reference numeral 118 denotes the step of writing analysis resumption information required for starting a present analysis as a continuation of the immediately preceding analysis. Reference numeral 119 denotes the step of recording an error. Reference numeral 120 denotes the step of executing a loop in a range of PBAs (Physical Block Addresses) of an analysis-object block already completing a write operation in the storage medium employed in the disk drive. Reference numeral 121 denotes the step of determining whether or not a write operation carried out on a block serving as the object of the analysis is a directory operation. Reference numeral 122 denotes the step of determining whether or not a write operation carried out on a block serving as the object of the analysis is a file operation. Reference numeral 123 denotes the step of determining whether or not a write operation carried out on a block serving as the object of the analysis is a block operation. Reference numeral 130 denotes a subroutine for a case where a write operation carried out on a block serving as the object of the analysis is a directory operation. Reference numeral 140 denotes a subroutine for a case where a write operation carried out on a block serving as the object of the analysis is a file operation. Reference numeral 150 denotes a subroutine for a case where a write operation carried out on a block serving as the object of the analysis is a block operation.

FIG. 2 is a PAD diagram referred to in explaining the subroutine 130 provided by the first embodiment of the present invention. In FIG. 2, reference numeral 200 denotes the PAD diagram referred to in explaining the subroutine 130 provided by the first embodiment implementing a falsification detection method provided by the present invention. Reference numeral 201 denotes the step of comparing a state existing before updating of meta information recorded in a block serving as the object of the analysis as meta information of a directory with a state existing after the updating of the meta information. Reference numeral 202 denotes the step of seeking for the next block. Reference numeral 210 denotes the step of determining whether or not the write operation is a file creation. Reference numeral 211 denotes the step of searching for the same file name existing in the past as the name of a file serving as the object of the analysis. Reference numeral 212 denotes the step of determining whether or not the same file name exists on the basis of a result of the search. Reference numeral 213 denotes the step of adding an item to existing file transition entries of the directory state transition repository as a file transition entry item for saving a result of an analysis. Reference numeral 214 denotes the step of adding a reference remark indicating an opposite direction to a file transition entry. Reference numeral 215 denotes the step of creating a new file transition entry in the directory state transition repository. Reference numeral 220 denotes the step of determining whether or not the write operation is a file deletion. Reference numeral 221 denotes the step of adding a file transition entry of a file deletion to the directory state transition repository. Reference numeral 230 denotes the step of determining whether or not the write operation is an operation to change the name of a file. Reference numeral 231 denotes the step of adding a file transition entry of a file-name modification to the directory state transition repository.

FIG. 3 is a PAD diagram referred to in explaining the subroutine 140 provided by the first embodiment of the present invention. In FIG. 3, reference numeral 300 denotes the PAD diagram referred to in explaining the subroutine 140 provided by the first embodiment implementing a falsification detection method provided by the present invention. Reference numeral 301 denotes the step of comparing a state existing before updating of meta information recorded in a block serving as the object of the analysis as meta information of a file with a state existing after the updating of the meta information. Reference numeral 310 denotes the step of checking whether or not meta information of a file has been updated. Reference numeral 311 denotes the step of adding an operation to update meta information as a file transition entry to the directory state transition repository. Reference numeral 312 denotes the step of searching an LBA (Logical Block Address) state transition repository for managing only LBAs of blocks each used for recording contents of an unidentifiable file for an LBA in meta information. Reference numeral 313 denotes the step of determining whether or not an LBA in meta information has already been cataloged in the LBA state transition repository for managing only LBAs of blocks each used for recording contents of an unidentifiable file. Reference numeral 314 denotes the step of moving an LBA block entry from the LBA state transition repository for managing only LBAs of blocks each used for recording contents of an unidentifiable file to an LBA state transition repository provided for blocks specified in the file transition entries of a file state transition repository. Reference numeral 315 denotes the step of searching an LBA block entry moved from an LBA state transition repository for managing only LBAs of blocks each used for recording contents of an unidentifiable file to an LBA state transition repository provided for blocks specified in the file transition entries of a file state transition repository for the LBA of a block for storing the tail of a file. Reference numeral 316 denotes the step of determining whether or not the LBA of a block for storing the tail of a file is included in an LBA block entry moved from an LBA state transition repository for managing only LBAs of blocks each used for recording contents of an unidentifiable file to an LBA state transition repository provided for blocks specified in the file transition entries of a file state transition repository. Reference numeral 317 denotes the step of adding a consistency flag to a management area of a rearmost block of a file. Reference numeral 318 denotes the step of checking consistency between meta information and information recorded in a flag area.

FIG. 4 is a PAD diagram referred to in explaining the subroutine 150 provided by the first embodiment of the present invention. In FIG. 4, reference numeral 400 denotes the PAD diagram referred to in explaining the subroutine 150 provided by the first embodiment implementing a falsification detection method provided by the present invention. Reference numeral 401 denotes the step of searching an LBA state transition repository of blocks specified in the file transition entries of a file state transition repository for the LBA of a block serving as the object of the analysis. Reference numeral 410 denotes the step of determining whether or not the LBA of a block serving as the object of the analysis has been cataloged in an LBA state transition repository provided for blocks specified in the file transition entries of a file state transition repository. Reference numeral 411 denotes the step of adding information associated with a block serving as the object of the analysis to an LBA state transition repository provided for blocks specified in the file transition entries of a file state transition repository. Reference numeral 412 denotes the step of checking consistency between meta information and information recorded in a flag area. Reference numeral 413 denotes the step of adding a reference remark indicating an opposite direction to an LBA state transition repository provided for blocks specified in the file transition entries of a file state transition repository. Reference numeral 414 denotes the step of determining whether or not a block serving as the object of the analysis is the last block for recording the end of the contents of a file. Reference numeral 415 denotes the step of adding a consistency flag to a management area of the last block of a file. Reference numeral 416 denotes the step of adding a new entry to an LBA state transition repository for managing only LBAs of blocks each used for storing contents of an unidentifiable file.

FIG. 5 is a PAD diagram referred to in explaining a method provided by the first embodiment of the present invention as a method of detecting a falsification of a file. In FIG. 5, reference numeral 500 denotes the PAD diagram referred to in explaining the method of detecting a falsification of a file in accordance with the first embodiment implementing a disk-drive control method and a file-falsification detection method, which are provided by the present invention. Reference numeral 501 denotes the step of specifying a path name. Reference numeral 510 denotes the step of looping a history of operations to update meta information of a directory state transition repository in a reversed order. Reference numeral 511 denotes the step of determining whether or not a path name is the specified path name. Reference numeral 512 denotes the step of reading out the substance of an operation from the history of operations to update meta information. Reference numeral 513 denotes the step of outputting the fetched substance of the operation to a console. Reference numeral 520 denotes the step of executing a loop as long as a fetched substance of the operation exists. Reference numeral 527 denotes the step of extracting a difference at a file level between replaced and replacing files. Reference numeral 528 denotes the step of outputting the file difference to the console. Reference numeral 531 denotes the step of reading out consistency of a history of operations to update meta information. Reference numeral 532 denotes the step of outputting the consistency of the history of operations to update meta information to the console. Reference numeral 533 denotes the step of reading out consistency of file updating. Reference numeral 534 denotes the step of outputting the consistency of file updating to the console.

FIG. 6 is a diagram showing a screen appearing on a display unit of a console as a screen provided by the first embodiment of the present invention. In FIG. 6, reference numeral 600 denotes the display screen of the console as a screen provided by the first embodiment implementing a disk-drive control method and a falsification detection method, which are provided by the present invention. Reference numeral 601 denotes an input portion for inputting a path name and reference numeral 602 denotes a command button for making a request for a display of an analysis result corresponding to the path name. Reference numeral 603 denotes a display area for displaying a meta-information difference and reference numeral 604 denotes a display area for displaying a file difference. Reference numeral 605 denotes a command button for making a request for invalidation of data and reference numeral 610 denotes a directory-operation display area. Reference numeral 611 denotes a display column for displaying the substance of each directory operation and reference numeral 612 denotes a display column for displaying the consistency of each directory operation. Reference numeral 613 denotes a row of a selected directory operation and reference numeral 620 denotes a display area for displaying blocks each used for recording the contents of a file. Reference numeral 621 denotes a display column for displaying the LBA of each block for recording the contents of a file. Reference numeral 622 denotes a display column for displaying the consistency of each block for recording the contents of a file.

Figure 7:
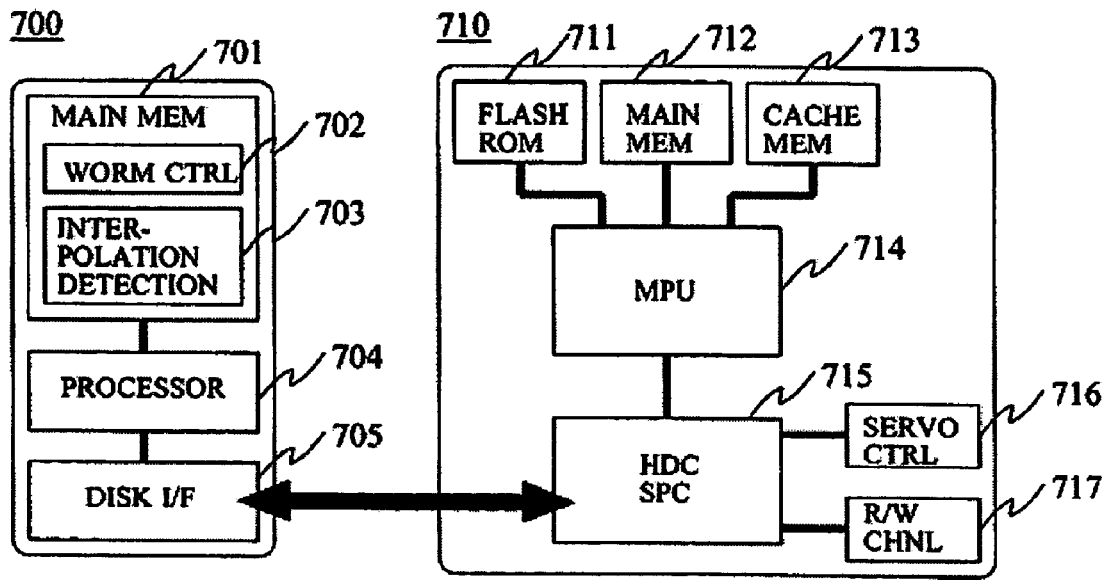
FIG. 7 is a block diagram showing hardware according to the first embodiment of the present invention.

FIG. 7 is a block diagram showing hardware according to the first embodiment of the present invention. In FIG. 7, reference numeral 700 denotes a block diagram showing a host and reference numeral 701 denotes a main storage unit. Reference numerals 702 and 703 denote a WORM (Write Once Read Many) control program and a falsification detection program respectively. Reference numerals 704 and 705 denote a processor and a disk interface respectively. Reference numeral 710 denotes a block diagram showing a disk drive and reference numeral 711 denotes a flash ROM. Reference numerals 712 and 713 denote a main memory and a cache memory respectively. Reference numeral 714 denotes a microprocessor (MPU). Reference numeral 715 denotes a hard disk controller (HDC) and an SCSI protocol controller (SPC). Reference numerals 716 and 717 denote a servo controller and a read/write channel.

Figure 8:
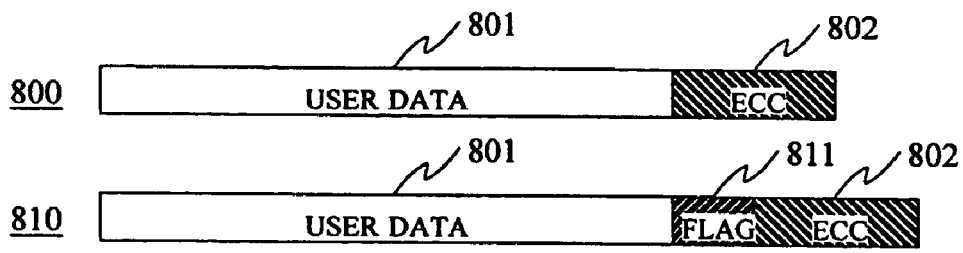
FIG. 8 is a diagram showing recording formats of a storage medium in a disk drive according to the first embodiment of the present invention.

FIG. 8 is a diagram showing a recording format of a block into the storage medium employed in a disk drive provided by the first embodiment of the present invention. In FIG. 8, reference numeral 800 denotes a block recording-format according to the conventional technology as a reference format. Reference numerals 801 and 802 denote user data and an error correction code respectively. Reference numeral 810 denotes a block recording-format according to the present embodiment and reference numeral 811 denotes a flag area.

Figure 9:
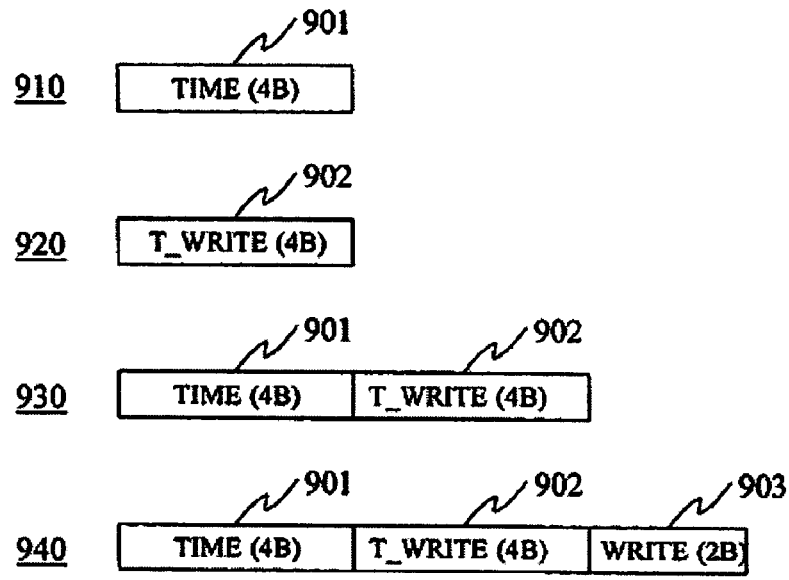
FIG. 9 is a diagram showing the data structure of a flag area according to the first embodiment of the present invention.

FIG. 9 is a diagram showing the data structure of the flag area 811 according to the first embodiment of the present invention. Reference numeral 901 denotes a total operating time of the disk drive 710 and reference numeral 902 denotes the total number of write commands issued to the disk drive 710. Reference numeral 903 denotes the number of write commands issued to an object sector. Reference numeral 910 denotes the data structure of the flag area 811 as a data structure including only the total operating time 901. Reference numeral 920 denotes the data structure of the flag area 811 as a data structure including only the total write-command count 902. Reference numeral 930 denotes the data structure of the flag area 811 as a data structure including the total operating time 901 and the total number write-command count 902. Reference numeral 940 denotes the data structure of the flag area 811 as a data structure including the total operating time 901, the total write-command count 902 and the write-command count 903 of the object sector.

Figure 10:
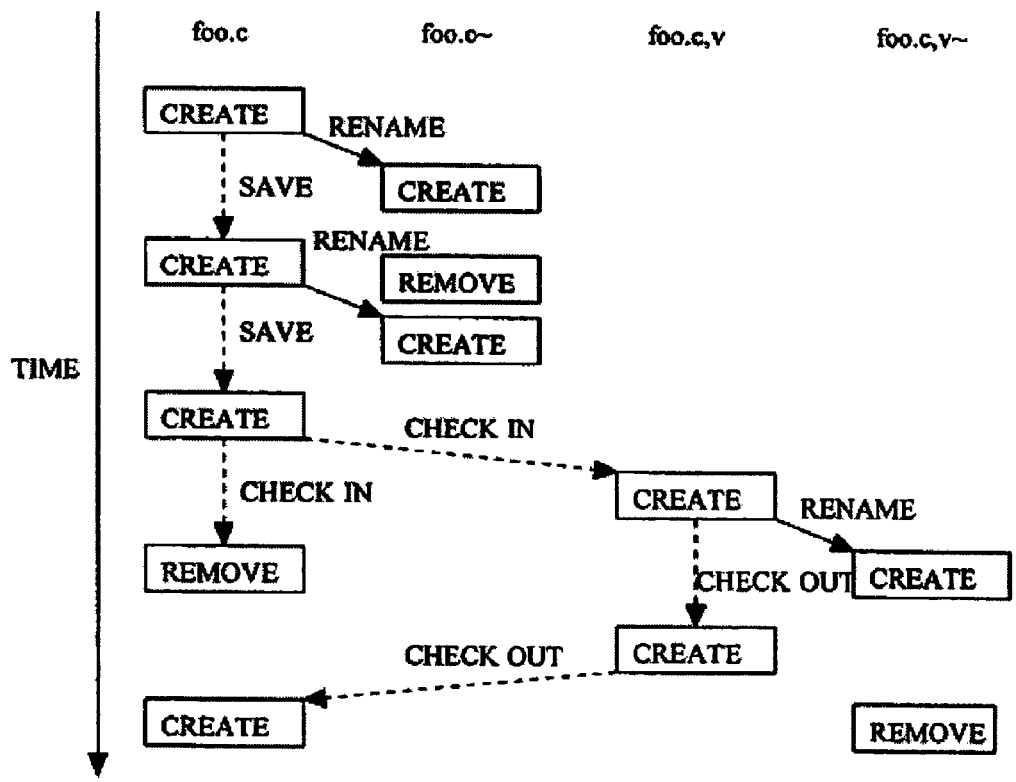
FIG. 10 is a diagram showing a directory state transition repository according to the first embodiment of the present invention.
Figure 18:
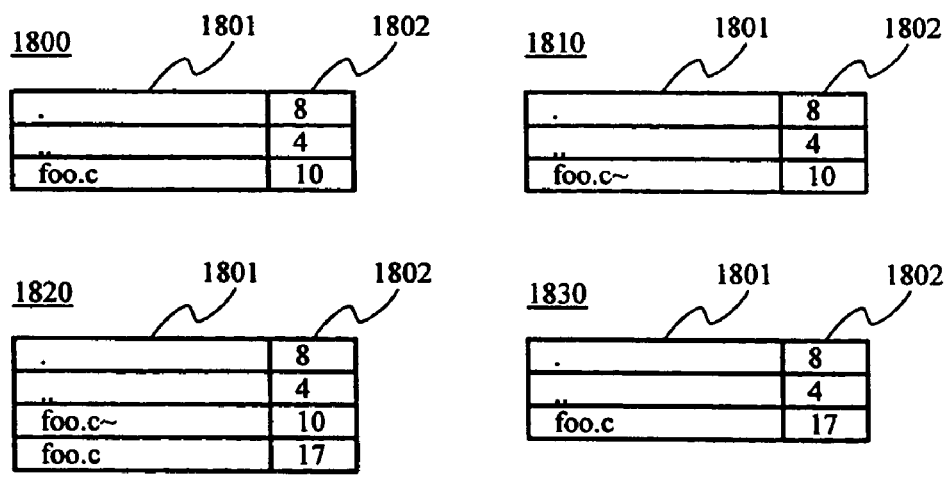
FIG. 18 is a diagram showing the data structure of a block for recording meta information of a directory in accordance with the first embodiment of the present invention.

FIG. 10 is a diagram showing a directory state transition repository according to the first embodiment of the present invention. FIG. 18 is a diagram showing the data structure of a block for recording meta information of a directory in accordance with the first embodiment of the present invention. In FIG. 18, reference numeral 1801 denotes a column showing file names or directory names and reference numeral 1802 denotes a column showing the inode number of each file or each directory. Reference numeral 1800 denotes a state indicating that there is only one file. Reference numeral 1810 denotes a state indicating that the file name has been changed. Reference numeral 1820 denotes a state indicating that a file has been added. Reference numeral 1830 denotes a state indicating that a file has been deleted.

Figure 19:
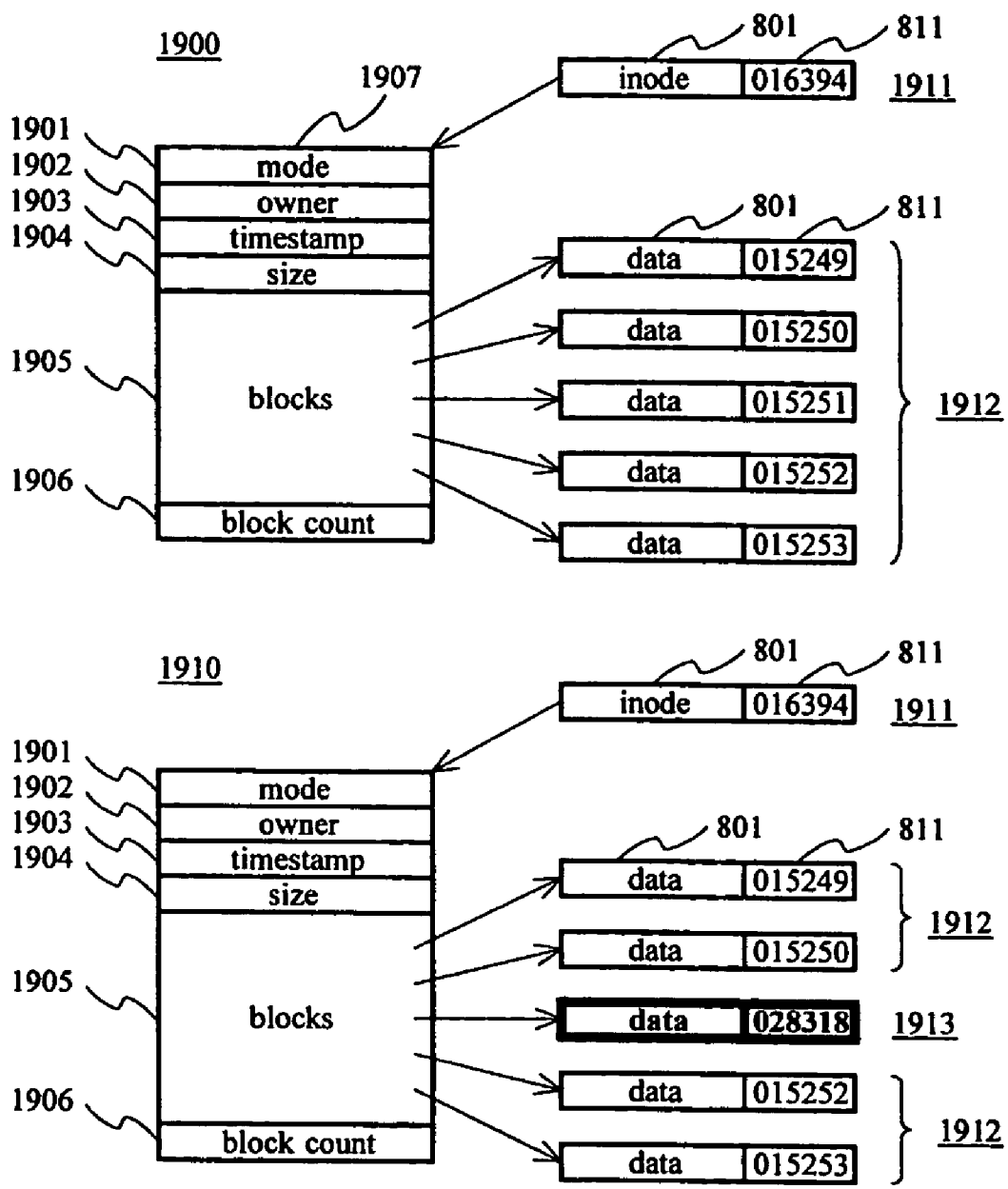
FIG. 19 is a diagram showing data structures of meta information of a file as data structures according to the first embodiment of the present invention.

FIG. 19 is a diagram showing data structures of meta information of a file and showing blocks of a storage medium, in accordance with the first embodiment of the present invention. In FIG. 19, reference numeral 1900 denotes an initial state and reference numeral 1901 denotes information on a file type and information on an access mode. Reference numeral 1902 denotes information on the owner of the file and reference numeral 1903 denotes a timestamp of the file. Reference numeral 1904 denotes the size of the file and reference numeral 1905 denotes the index numbers of each block for recording contents of the file. Reference numeral 1906 denotes the total number of blocks used for recording the contents of the file and reference numeral 1907 denotes the data structure of the inode. Reference numeral 1911 denotes a block for recording the inode of the file and reference numeral 1912 denotes blocks each used for recording contents of the file. Reference numeral 1913 denotes a block containing updated contents of the file and reference numeral 1910 denotes a state obtained after a block has been changed.

FIG. 20 is a diagram showing the data structure of a directory state transition repository according to the first embodiment of the present invention. In FIG. 20, reference numeral 2000 denotes the directory state transition repository and reference numeral 2001 denotes a column showing the value recorded in a flag area of a block for storing meta data of each file serving as the object of the analysis or each directory serving as the object of the analysis. Reference numeral 2002 denotes a column showing the name of a directory to which each file serving as the object of the analysis or each directory serving as the object of the analysis pertains. Reference numeral 2003 denotes a column showing the name of each file serving as the object of the analysis or each directory serving as the object of the analysis. Reference numeral 2004 denotes a column showing the file type of each object of the analysis and reference numeral 2005 denotes a column showing the type of an operation carried out on each file serving as the object of the analysis or each directory serving as the object of the analysis. Reference numeral 2006 denotes a column showing the inode number of each file serving as the object of the analysis or each directory serving as the object of the analysis and reference numeral 2007 denotes a column showing a remark on each file serving as the object of the analysis or each directory serving as the object of the analysis.

Reference numeral 2011 denotes an entry of a file newly added to the directory. Reference numeral 2012 denotes an entry of a file with the name thereof changed. Reference numeral 2013 denotes an entry of a new file added to the directory as a file having a file name identical with the name of a file existing in the past. Reference numeral 2014 denotes an entry of a directory newly added to the directory. Reference numeral 2015 denotes an entry of a file deleted from the directory. Reference numeral 2016 denotes an entry of a directory deleted from the directory. Reference numeral 2017 denotes an entry of a new file added to the directory as a file having a file name identical with the name of a file existing in the past.

FIG. 21 is a diagram showing the data structure of a file state transition repository according to the first embodiment of the present invention. In FIG. 21, reference numeral 2100 denotes the file state transition repository for a specific file and reference numeral 2101 denotes a column showing the value recorded in a flag area of each block for storing meta information of the file. Reference numeral 2102 denotes a column showing the type of each operation carried out on the file. Reference numeral 2103 denotes a column showing the timestamp of each operation carried out on the file and reference numeral 2104 denotes a column showing the index number of blocks each involved in each operation carried out on the file as blocks for recording contents of the file. Reference numeral 2105 denotes a column showing a remark on each operation carried out on the file.

Reference numeral 2111 denotes an entry of a file newly added to the directory. Reference numeral 2112 denotes an entry of a file with the name thereof changed. Reference numeral 2113 denotes an entry of a created file having the same name as a file existing in the past. Reference numeral 2114 denotes an entry of a block added to the file as a block for recording contents of the file. Reference numeral 2115 denotes an entry of a changed attribute of the file. Reference numeral 2116 denotes an entry of blocks each added to the file as a block for recording contents of the file. Reference numeral 2117 denotes an entry of a deleted file. Reference numeral 2118 denotes an entry of the file name of another file as a file name changed to the file name of a file existing in the past. Reference numeral 2119 denotes an entry of changed blocks each used for recording contents of the file.

Figures 22, 23:
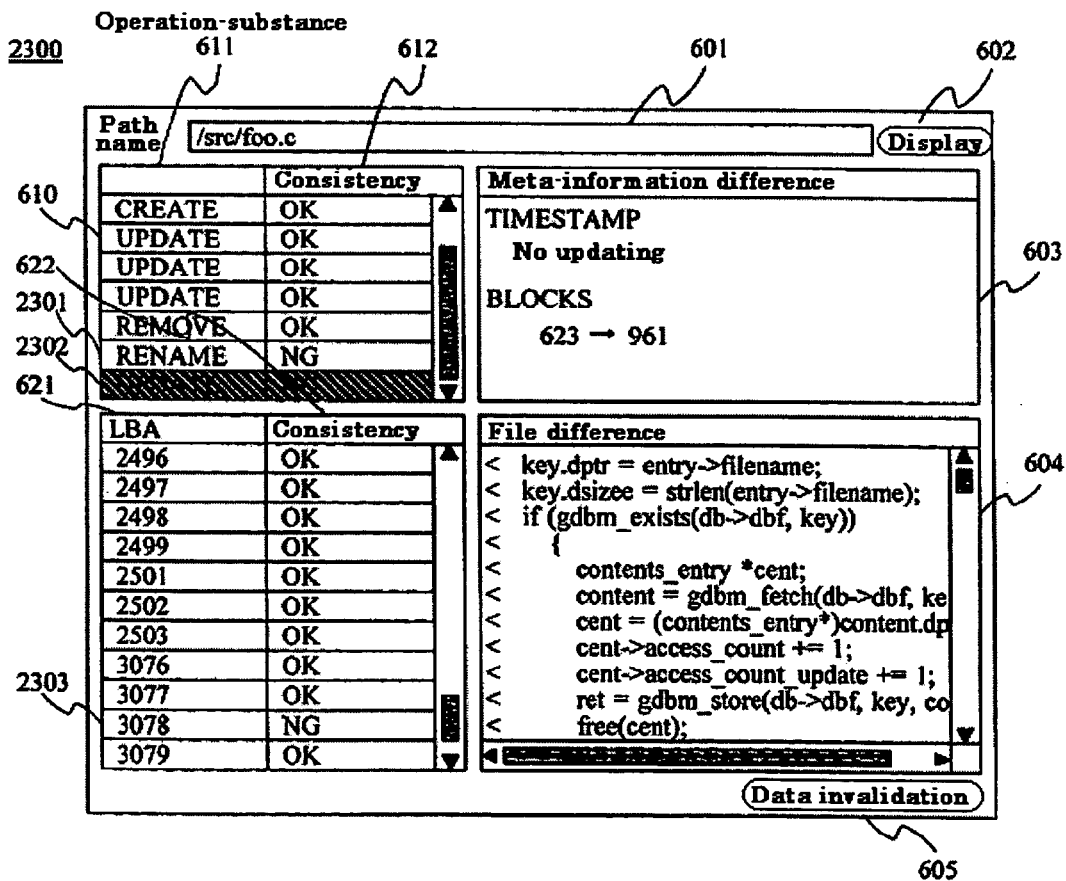
FIG. 22 is a diagram showing the data structure of an LBA state transition repository provided for blocks specified in the file transition entries of a file state transition repository as an LBA state transition repository according to the first embodiment of the present invention.
FIG. 23 is a diagram showing a typical screen appearing on the display unit of a console as a screen according to the first embodiment of the present invention.

FIG. 22 is a diagram showing the data structure of an LBA state transition repository provided for blocks specified in the file transition entries of a file state transition repository according to the first embodiment of the present invention. In FIG. 22, reference numeral 2200 denotes the LBA state transition repository and reference numeral 2201 denotes a column showing the index number of each block for recording the contents of the file. Reference numeral 2202 denotes a column showing the LBA of each sector corresponding to the index number of every block.

Reference numeral 2203 denotes an entry including the LBA of every sector for recording the contents of a block indicated by a block number of 204. In the same way, reference numeral 2204 denotes an entry including the LBA of every sector for recording the contents of a block indicated by a block number of 251. Likewise, reference numeral 2205 denotes an entry including the LBA of every sector for recording the contents of a block indicated by a block number of 516. Similarly, reference numeral 2206 denotes an entry including the LBA of every sector for recording the contents of a block indicated by a block number of 538. By the same token, reference numeral 2207 denotes an entry including the LBA of every sector for recording the contents of a block indicated by a block number of 621. In the same way, reference numeral 2208 denotes an entry including the LBA of every sector for recording the contents of a block indicated by a block number of 622. Likewise, reference numeral 2209 denotes an entry including the LBA of every sector for recording the contents of a block indicated by a block number of 623. Similarly, reference numeral 2210 denotes an entry including the LBA of every sector for recording the contents of a block indicated by a block number of 624. By the same token, reference numeral 2211 denotes an entry including the LBA of every sector for recording the contents of a block indicated by a block number of 625. In the same way, reference numeral 2212 denotes an entry including the LBA of every sector for recording the contents of a block indicated by a block number of 961.

FIG. 23 is a diagram showing a typical screen appearing on the display unit of a console as a screen according to the first embodiment of the present invention. In FIG. 23, reference numeral 2300 denotes a typical display of the console and reference numeral 2301 denotes a row including a problem of consistency. Reference numeral 2302 denotes a row including selected meta information and reference numeral 2303 denotes a row including an LBA having a problem of consistency.

This embodiment is characterized in that a falsification of data stored into the storage medium employed in the disk drive system is detected by analyzing the data by adoption of a method for analyzing the following two types of information:

(1) a time transient experienced by a file system as a time transient caused by creation or deletion of a file, creation or deletion of a directory, modification of the name of a file or modification of the name of a directory, and (2) a time transient of the operation to write data into a block in the storage medium employed in the disk drive as a block for recording contents of a file stored in the storage medium.

An outline of the first embodiment of the present invention is explained with reference to FIG. 7.

A host 700 comprises a processor 704, a main storage unit 701 and a disk interface 705. The processor 704 executes a WORM control program 702 stored in the main storage unit 701, issuing a write command to a disk drive 710 by way of the disk interface 705 in order to write received data as data to be stored into a storage medium employed in the disk drive 710 as requested by the user in such a way that the received data is not written over data already existing in the storage medium. The processor 704 executes a falsification detection program 703 to determine whether or not data written into the storage medium of drive 710 in this way has been falsified. The falsification detection program 703 analyzes a time transient of the data in accordance with an algorithm explained by referring to FIGS. 1 to 5 and shows a result of the falsification detection to the user on a screen appearing on the display unit of the console as shown in FIG. 6.

A control program of the disk drive 710 is stored in a flash ROM 711. When the power supply of an MPU 714 is turned on, the MPU 714 loads the control program from the flash ROM 711 into a main memory 712. The control program also generates data to be written into a flag area shown in FIG. 8.

An HDC/SPC 715 receives a command from the host 700 and transmits a response to the host 700. The SPC transmits and receives a command and data in accordance with an SCSI protocol. After a process carried out by the SPC is ended, processing control is transferred to the MPU 714.

The MPU 714 executes the control program loaded in the main memory 712 to carry out necessary processing to make an access to the storage medium of the HDD (the disk drive 710). Write data received from the host 700 and read data read out from the storage medium of the HDD are stored in a cache memory 713. The main memory 712 is also used for storing variables necessary for generating data to be written into the flag area shown in FIG. 8.

After the MPU 714 completes the processing carried out thereby, the processing control is transferred to the HDC. The HDC issues an instruction specifying a physical block address to a read/write channel 717. The physical block address has been obtained as a result of an address conversion process carried out by the MPU 714. Receiving the instruction, the read/write channel 717 carries out a write operation to write data at the physical block address in the storage medium, or a read operation to read out data stored at the address from the storage medium. In the case of a write operation, the read/write channel 717 transfers write data stored in the cache memory 713 to the physical block address along with data generated on the basis of the variables stored in the main memory 712 to the flag area in the storage medium.

In order to make the disk drive 710 capable of writing information based on an internal state of the disk drive 710 into the flag area instead of writing information into the flag area in accordance with a command received from the host 700, the disk drive 710 is provided internally with:

(1) a flag-area generation module for allocating the flag area in the storage medium;
(2) an internal-state information generation module for generating information to be written into the flag area from the internal state of the disk drive 710; and
(3) an internal-state information write module for actually writing the information generated by the internal-state information generation module into the flag area allocated by the flag-area generation module.

If the flag area is provided after user data in the data format as shown in FIG. 8, it is necessary to change the recording format in the storage medium. Since the HDC is the component for controlling the recording format, the flag-area generation module is a portion of the HDC employed in the HDC/SPC 715.

In order to generate the information based on the internal state of the disk drive 710, the MPU 714 must function as a processor capable of collecting the information and, if necessary, processing the collected information. In addition, in order to reference the information based on the internal state at a later time, it is necessary to preserve the information in a memory. Thus, the internal-state information generation module is implemented by the MPU 714 and the main memory 712.

In order to write the information based on the internal state into the storage medium employed in the disk drive 710, it is necessary to carry out a process of transferring the information from a data buffer to the storage medium by controlling a write head. The MPU 714 is the component for writing the information based on the internal state into the cache memory 713 serving as the data buffer. A servo controller 716 is the component for controlling the write head and the read/write channel 717 is the component for carrying out an operation of transferring the information based on the internal state from the cache memory 713 to the storage medium. Thus, the internal-state information write module is implemented by the MPU 714, the cache memory 713, the servo controller 716 and the read/write channel 717.

In the case of a disk drive for carrying out write and read operations by using a block interface, the only apparatus knowing the structure of data written into the storage medium employed in the disk drive is a host that has written the data into the storage medium. Thus, in order to detect the existence of a falsification of the data written into the storage medium employed in the disk drive, it is necessary to execute a falsification detection analysis program understanding the structure of the data written by the host after keeping a history of all write operations in the disk drive.

In order to preserve the history of all write operations in the disk drive, it is necessary to write data into the storage medium employed in the disk drive by execution of WORM control for recording new data into a free area on the storage medium so as to prevent existing data from being overwritten. The WORM control can be executed in two ways, i.e., execution in the disk drive and execution in the host.

The execution of the WORM control in the disk drive offers a merit in which the history of write operations can be kept in the disk drive with a high degree of reliability even if the host issues a write command to the disk drive to write new data over data already existing in the storage medium employed in the disk drive. However, the execution of the WORM control in the disk drive has a demerit in which, if the host writes data into a storage medium employed in the disk drive without being aware of a WORM condition, an access performance will deteriorate due to processing such as an address conversion process carried out in the disk drive.

The execution of the WORM control in the host offers a merit of no access-performance deterioration. However, the execution of the WORM control in the host has a demerit in which data can be falsified with ease due to the fact that new data can be written over data already existing into the storage medium employed in the disk drive.

In this embodiment of the present invention, the host executes the WORM control in an operation to write data into the storage medium employed in the disk drive. Since the disk drive is capable of detecting an operation to write data over data already existing in the storage medium, however, the embodiment has the effect of an ability to detect a falsification without relaying on an outside authenticator as is the case with the method disclosed in Japanese Patent Laid-open No. 11-261550. In addition, since the format of data to be written into the storage medium employed in the disk drive is not limited to the format compatible with the file system, unlike the method disclosed in Japanese Patent Laid-open No. 10-283262, the embodiment has the effect of an ability to detect a falsification even for an arbitrary application other than the file system. On the top of that, the method provided by the present embodiment can be applied with ease to not only a case in which the host executes the WORM control in an operation to write data into the storage medium employed in the disk drive, but also to a case in which the disk drive executes the WORM control in an operation to write data in the storage medium employed in the disk drive.

Furthermore, even though a method to detect a falsification in a file system in accordance with this embodiment is explained, the method to detect a falsification can also be applied to any arbitrary data other than the file system as long as the data is data recorded in a logical structure. An example of such data is a database.

With reference to FIGS. 1 to 4, the following description explains a method of tracing a write history required for falsification detection based on a file system. In an operation to trace a write history of data, which was written on a storage medium in a disk drive, in an order the data was written thereon, and an operation to detect a falsification of the data, the value of each LBA (Logical Block Address) completing an analysis and a result of the analysis are stored. Thus, another analysis can be started as a continuation of the analysis, which is an analysis immediately preceding the other analysis. By suspending and resuming an analysis in this way, it is necessary to merely analyze only the contents of a file newly stored in the storage medium employed in the disk drive. Thus, there is demonstrated the effect of an ability to shorten the analysis time.

Since an analysis is suspended and resumed as described above, at the step 110 described before, a work area allocated in the storage medium employed in the disk drive 710 as an area used specially for detecting a falsification is examined to determine whether or not a result of an analysis made previously has been saved in the area. If a result of an analysis made previously has been saved in the work area, the PAD flow goes on to the step 111. If no result of an analysis made previously has been saved in the work area, on the other hand, the PAD flow goes on to the step 113. At the step 111, the result of an analysis made previously is fetched. Then, at the next step 112, analysis resumption information required for resuming the analysis is fetched and a seek operation is carried out to position the head at the LBA of a continuation of the immediately preceding analysis. The analysis resumption information includes at least the value of an LBA for which the setting of an analysis program and an analysis by using the program have been completed.

If no result of a previous analysis has been saved in the work area, the analysis program can be assumed to be in a state of being never executed even once. In this case, steps 113, 114 and 115 are executed to set the analysis program. An analysis program is required for every data format, that is, for every file system kept in the disk drive 710. A process of providing an analysis program for every file system stored in the disk drive 710 takes a very large number of man-hours. In order to solve this problem, the analysis program is divided into two portions, i.e., (1) a definition portion for defining the data structure of a file system and (2) a search portion based on the definition of every defined data structure. In this way, a definition portion is prepared for every file system but only one search portion common to all file systems is required. At the step 113, the data structure of a file system is loaded from a volume included in the disk drive 710 as a volume serving as the object of the analysis into a parameter area allocated in the main storage unit 701 as an area for the falsification detection program 703. Then, at the next step 114, the falsification detection program 703 inputs the data structure loaded at the step 113. Finally, at the next step 115, a seek operation is carried out to position the head at the beginning of the volume serving as the object of the analysis.

At the step 120, a loop is executed in an LBA (Logical Block Address) range of a block already completing a write operation in the storage medium employed in the disk drive. The loop is executed to make an analysis in dependence on whether the write operation carried out on the block is a directory operation, a file operation or a block operation. This is because write operations carried out on a block through a file system can be classified into the following three categories:

(1) directory operations such as creation and deletion of a file and creation and deletion of a directory;
(2) file operations such as an operation to update meta information of a file; and
(3) block operations, which are all operations to write data into a block except the directory and file operations.

One of the three categories can be uniquely determined by a data structure loaded at the step 113 as a category to which a write operation carried out on a block pertains. At the step 121, the write operation carried out on the block is examined to determine whether or not the write operation is a directory operation. If the write operation carried out on the block is a directory operation, the PAD flows go on to the subroutine 130. At the step 122, the write operation carried out on the block is examined to determine whether or not the write operation is a file operation. If the write operation carried out on the block is a file operation, the PAD flows go on to the subroutine 140. At the step 123, the write operation carried out on the block is examined to determine whether or not the write operation is a block operation. If the write operation carried out on the block is a block operation, the PAD flows go on to the subroutine 150. Finally, if the write operation carried out on the block is not a directory operation, a file operation and a block operation, the write operation can be interpreted as a generated error. In this case, the PAD flow goes on to the step 119 at which the error is recorded. After the analysis in the loop executed at the step 120 is ended for all LBAs each completing a write operation, the PAD flow goes on to the step 116 at which a location for saving a result of the analysis is allocated. Then, the PAD flow goes on to the step 117 at which the result of the analysis is saved. Eventually, the PAD flow goes on to the step 118 at which information necessary for resuming the analysis is saved.

To put it in detail, at the step 116, a location for saving the result of the analysis is allocated in the work area allocated in the storage medium employed in the disk drive 710 as an area specially used for detecting a falsification of data. Then, the PAD flow goes on to the step 117. At the step 117, the analysis result for the volume analyzed in the loop executed at the step 120 is stored at the location allocated at the step 116 in the work area. Then, the PAD flow goes on to the step 118. At the step 118, information necessary for resumption of the analysis from an LBA, for which the present analysis has been completed, is saved at the location allocated at the step 116 in the work area in order to allow the next analysis to be made. The information saved as information necessary for resumption of the analysis includes at least the data set in the analysis program at the step 114 and the value of an LBA completing the analysis made in the loop executed at the step 120.

The subroutine executed at the step 130 searches the directory structure for a change in directory structure as a change made through the file system. Such a change in directory structure is made as a result of creation of a file or a directory, deletion of a file or a directory or modification of the name of a file or a directory. In order to recognize a generated change in directory structure, it is necessary to check into an updating command issued by the host for a block for recording meta information as information for managing directory entries. Since all updating substances are recorded in the disk drive serving as the target of a write operation carried out by execution of the WORM control, it is possible to determine what operation has been carried out by comparison of data before the modification with data after the modification. If a change in directory structure is recognized, the substance of the change is recorded in a directory state transition repository for managing such changes.

At the steps 140 and 150, changes in file contents are checked. A time transient of a block for recording the changed contents is recorded in a file state transition repository.

Development of a program for manipulating a file by using a text editor and an RCS (Revision Control System) is used as an example in explanation of the directory state transition repository. FIG. 10 is a diagram showing the progression of a directory state transition repository along the time axis. In this figure, time lapses in the downward direction. Every solid-line arrow represents the event of a directory operation that can be detected from a falsification detection algorithm. On the other hand, every dashed-line arrow represents the event of a directory operation that can be determined from an application in use.

At a stage of saving a file named for the first time by using a text editor, a CREATE event is cataloged in a foo.c entry. Then, when a file named foo.c is updated and saved by using a text editor such as Emacs, the name of the pre-updating file is changed to foo.c~ and the file named foo.c~ is also saved. Thus, a new foo.c~ entry is created and a CREATE event is cataloged in the foo.c~ entry as an event of renaming the file from foo.c to foo.c~. Then, when the file named foo.c is again updated, the file named foo.c~ is deleted once, the name of the already existing pre-updating file is changed to foo.c~ and the file named foo.c is saved. Thus, in the foo.c~ entry of the directory state transition repository, a REMOVE event is cataloged as an event of deleting the file named foo.c~, and a CREATE event is also cataloged as an event of renaming the file named foo.c to foo.c~.

In development of a program, the RCS manages versions of the file for storing the program. In the RCS, a check-in operation caused the item of an original file to be deleted from an RCS file for storing a history of the file. Subsequently, when the file is edited, a check-out operation fetches the file from the RCS file. A check-in operation catalogs a CREATE event in an foo.c,v entry of the directory state transition repository and a REMOVE event in the foo.c entry of the directory. In a check-out operation, the name of the user fetching the file and information on the fetching time and others are cataloged in the RCS file. In order to prevent an original file from being lost due to an accident in the course of an operation to write data into the file, the original file is saved as a file having a different name. Then, after the data has been written into the file normally and the normal write operation has been verified, the saved original file is discarded. Thus, a CREATE event is cataloged in a foo.c,v~ entry of the directory state transition repository as an event of renaming the original file to the other name. Then, after a CREATE event is cataloged in the foo.c,v entry of the history, a REMOVE event is cataloged in a foo.c,v~ entry of the history.

With reference to FIGS. 18 and 19, the following description explains the format of data stored into the storage medium employed in the disk drive as a format conforming to the file system. FIG. 18 is a diagram showing the data format of a block included into the storage medium employed in the disk drive as a block for storing meta information of a directory. The data format is a structure comprising entries each consisting of a pair of the name 1801 of a file in the directory or the name of the directory and an inode number 1802 of an inode for keeping the meta information for the file or the directory.

Reference numeral 1800 denotes the data format of an initial state indicating that only one file named foo.c exists in the directory. Reference numeral 1810 denotes the data format of a state after the name of the file has been changed from foo.c to foo.c~. Since the contents of the file do not change even after the file is renamed, the inode number serving as an index to an inode for recording the meta information for the file also remains the same as well. Reference numeral 1820 denotes the data format of a state after a file named foo.c is added to the directory. Even though the name of the added file is the same as the file name in the data format 1800, a new inode number assigned to the added file is different from the inode number of the file named foo.c in the data format 1800. This is because the contents of the added file are different from those of the file named foo.c in the data format 1800. Reference numeral 1830 denotes the data format of a state after the file named foo.c~ is deleted from the directory.

FIG. 19 is a diagram showing data structures of meta information of a file and showing blocks of a storage medium. Reference numeral 1911 denotes a block for recording the inode of the file. User data 801 of the block 1911 includes the inode stored therein. Reference numeral 1907 denotes the data structure of the inode. Reference numeral 1900 denotes a pre-updating state of the contents of the file and reference numeral 1910 denotes a post-updating state of the contents of the same file. A flag area 811 is attached to each of blocks 1911 to 1913.

Reference numeral 1901 denotes information on an access mode determining a file type and a permission type. The file type includes a directory, a file or a symbolic link. On the other hand, the permission type can be read permission, write permission or execute permission. Reference numeral 1902 denotes information on the owner of the file and reference numeral 1903 denotes timestamps of the file. The recorded timestamps of the file include three kinds of time, i.e., a most recent time to read out the contents of the file, a most recent time to write data into the file and a most recent time to update the inode of the file. Reference numeral 1904 denotes the size of the file and reference numeral 1905 denotes the index number of each block for recording contents of the file. The index numbers 1905 can each be used for identifying one of blocks 1912 for recording the contents of the file. Reference numeral 1906 denotes the total number of blocks used for recording the contents of the file.

In order to update the contents of the file, it is necessary to update a block for recording contents like a block 1913. When the index number 1905 of a block is changed or a block for recording contents of the file is added, the index number 1905 of the block needs to be updated. In this case, the file-updating time included in the timestamps 1903 to update the file is also changed. In addition, the inode-updating time is changed as well.

It is to be noted that the structure of the file system determines which block is used as a block for storing information corresponding to the inode number. By the same token, the structure of the file system also determines which sector in the HDD is used as a sector for storing the index number of a block.

FIG. 20 is a diagram showing the data structure of a directory state transition repository. In FIG. 20, reference numeral 2001 denotes a column showing a result of sorting the values stored in flag areas. From an analysis of blocks each having a data structure shown in FIG. 18 and meta information stored in the blocks as shown in FIG. 19, data is organized to form entries (or rows) in the directory state transition repository. Every entry includes data as below. Reference numeral 2002 denotes the name of a directory to which a file (or a directory) serving as the object of the analysis pertains. Reference numeral 2003 denotes the name of the file or the directory. Reference numeral 2004 denotes a file type, which can be a file or a directory. Reference numeral 2005 denotes the type of an operation carried out on the file or the directory. Reference numeral 2006 denotes the inode number of the file or the directory. Reference numeral 2007 denotes what is known at an analysis time as a remark on the file or the directory. The file or the directory is associated with the value 2001 recorded in a flag area 811 of a block for storing the meta information (the inode) of the file or the directory. A directory name 2002 and a name 2003 in the same entry as the directory name 2002 can be used for identifying a file or a directory in the file system.

For example, an entry 2011 includes data for a new file, which did not exist in the directory state transition repository so far. In the case of this entry, the operation type 2005 is CREATE and the remark 2007 states "new file." By the same token, an entry 2014 includes data for a new directory. In the case of this entry, the operation type 2005 is CREATE and the remark 2007 states "new dir." An entry 2012 includes data representing a change of a file name. Even if a file name is changed, the inode number remains the same. Thus, it is possible to identify a file (or a directory), the name of which has been changed from a file name to another. In the case of the entry 2012, the file name has been changed from foo.c to foo.c~ newly set as the file name 2003 with "SRC foo.c" described in the remark 2007 to indicate that the original file name is foo.c. For indicating this change of the file name, RENAME is set as the operation type 2005. An entry 2015 includes data representing deletion of a file. In this case, REMOVE is set as the operation type 2005.

FIG. 21 is a diagram showing the data structure of a file state transition repository. In particular, this figure shows the file state transition repository for the /src/foo.c file represented by data in an entry of the directory state transition repository shown in FIG. 20. An entry 2111 corresponds to the entry 2011. The entry 2111 includes data representing creation of a new file named /src/foo.c. A flag 2101 is the value recorded in a flag area 811 of a block for recording meta information (or the inode) of the file. Reference numeral 2103 denotes the value of a timestamp 1903 included in the meta information of the file. FIG. 21 shows timestamps each including only an updating time of the file due to a limited space. In actuality, the timestamp 1903 includes all the aforementioned pieces of timestamp information. Reference numeral 2104 denotes the value of an index number 1905 pointing to a block for recording contents of the file. A remark 2105 states "new file" indicating creation of a new file.

By the same token, an entry 2112 corresponds to the entry 2012. The entry 2112 includes data representing a state indicating that the file name /src/foo.c has been changed to /src/foo.c~. An operation type 2102 of this entry 2112 is thus RENAME. The remark 2105 states "DST foo.c~" indicating that the post-change file name is foo.c~. In the same way, an entry 2113 corresponds to the entry 2013. The entry 2113 includes data representing a state indicating that a new file with a file name of /src/foo.c has been created. An entry 2114 includes data representing a state indicating that blocks for recording contents of a file have been added. In this entry, the operation type 2102, the time stamp 2103 and the block index number 2104 are respectively UPDATE, a file-updating time and the index numbers of the added blocks. The remark 2105 states ADD BLK indicating that blocks have been added. An entry 2115 includes data representing a state indicating that an attribute of the file has been changed. An example of the attribute is an access mode. In this entry, the operation type 2102 is UPDATE and the remark 2105 states MOD ATTR. Since the timestamp 2103 in the entry 2115 also shows only the attribute-updating time, the shown attribute-updating time is the same as that of the entry 2114. However, the timestamp 2103 in the entry 2114 shows an inode-updating time. An entry 2117 includes data representing a state indicating that the file has been deleted. The operation type 2102 in this entry states REMOVE. An entry 2118 includes data representing a state indicating that a file name of /src/baz.c has been changed to the file name of/src/foo.c. In this entry, the operation type 2102 is RENAME and the remark 2105 states SRC baz.c. An entry 2119 includes data representing a state indicating that blocks for recording contents of the file have been replaced. In this entry, the operation type 2102 is UPDATE and the remark 2105 states MOD BLK. After the blocks have been replaced, the index numbers 2104 of the replaced blocks are recorded in the entry.

In a state transition from the entry 2117 to the entry 2118, the file has been replaced with the timestamp 2103 of the entry 2118 remaining unchanged from that of the entry 2117. The same timestamps indicate that it is quite within the bounds of possibility that the file has been falsified by file replacement. By the same token, the fact the timestamp of the entry 2119 remains the same as that of the entry 2118 suggests that it is quite within the bounds of possibility that the file has been falsified by block replacement.

FIG. 22 is a diagram showing the data structure of an LBA state transition repository provided for blocks inside a file state transition repository. To be more specific, the LBA state transition repository shown in FIG. 22 is a history provided for blocks inside the file state transition repository shown in FIG. 21. Reference numeral 2201 denotes a column showing the index number of each block. Associated with the index number 2201, reference numeral 2202 denotes a column showing the LBA of each sector in a hard disk employed in the HDD. A block corresponds to 4 sectors. In addition to the LBAs, the column 2202 also shows the values stored in flag areas 811 each associated with one of the LBAs.

Data included in the file state transition repository shown in FIG. 21 is obtained as a result of an analysis made at a meta-information level of the file, while data included in the LBA state transition repository shown in FIG. 22 is obtained as a result of an analysis made at an LBA level of the hard disk mounted on the HDD. Thus, even if data stored in a sector of a hard disk employed in the HDD is changed without going through the file system, the falsification can be detected. For example, look at an entry 2212. In this entry, the value recorded in a flag area 811 for an LBA of 3078 assigned to one of the four sectors composing a block does not exhibit continuity with respect to the values for the remaining sectors. This discontinuity obviously indicates that it is quite within the bounds of possibility that a falsification has been made with regard to the LBA of 3078.

FIG. 22 shows only a post-falsification state of the entry 2212 for a block of 961. By carrying out the process to detect a falsification periodically and saving the directory state transition repository shown in FIG. 20, the file state transition repository shown in FIG. 21 as well as the LBA state transition repository shown in FIG. 22, however, both states before and after a falsification at an LBA can be recorded in the LBA state transition repository.

At the step 201 of the subroutine executed at the step 130 in FIGS. 1 and 2, a pre-change state of meta information is compared with a post-change state thereof. Meta information of a directory can be identified by using an identifier of the directory. Thus, pieces of meta information recorded previously are searched for a piece having the same identifier as the object of the analysis, and the meta information found in the search is compared with that of the object of the analysis. This comparison can be carried out due to the fact that data has been written on the storage medium employed in the disk drive by execution of the WORM control. After a point of change is detected in the comparison, the PAD flow goes on to the step 210. At the step 210, a result obtained at the step 201 is examined to determine whether or not a file has been newly created. If a file has been newly created, the PAD flow goes on to the step 211. After the processing of the step 210 is ended, the PAD flow goes on to the step 220.

As described above, if data is saved in an existing file by an application, the contents of the existing file are left in a file serving as a backup with a file name different from the old name of the existing file so that the existing file becomes a file for recording new contents by retaining the old name in some cases. Thus, in order to detect a falsification of a file having an old name, it is necessary to trace operations to update the file. At the step 211, in order to implement this method of tracing operations to update a file, the file transition entries of the directory state transition repository are searched for the same file name existing in the past. After the search is completed, the PAD flow goes on to the step 212. At the step 212, the search result obtained at the step 211 is examined to determine whether or not the same file name existed in the past. If the same file name existed in the past, the PAD flow goes on to the step 213. If the same file name did not exist in the past, on the other hand, the PAD flow goes on to the step 215. For example, assume that data is written into an existing file named A, and the previous contents of the file named A are retained in a new file named A.BACKUP. In this case, at the step 213, a state indicating that a new file named A has been created is added to existing file transition entries included in the directory state transition repository as a new entry for the existing file named A. In addition, an entry indicating that the name of the existing file has been changed from A to A.BACKUP is added to the directory state transition repository.

If an analysis of blocks is made in an order the blocks were written into the storage medium employed in the disk drive, file transition entries of the directory state transition repository can be traced only in the order the files were updated. If it is desired to determine whether or not a specific file has been falsified, however, tracing the file from the most recent state to previous states is convenient. Thus, at the next step 214, a reference remark is added to the file transition entry added at the step 213 as a remark indicating an opposite direction of the file tracing from the state indicated by the file transition entry added at the step 213 to the preceding state. At the next step 215, a new file transition entry for the new file is created in the directory state transition repository to indicate that the new file has been created.

At the step 220, a comparison result obtained at the step 201 is examined to determine whether or not a file has been deleted. If a file has been deleted, the PAD flow goes on to the step 221. After the step 220 is ended, the PAD flow goes on to the step 230. At the step 221, a state indicating that a file has been deleted is added as a file transition entry to the directory state transition repository. Then, the PAD flow goes on to the step 214. At the next step 214, a reference remark is added to the file transition entry as a remark indicating an opposite direction of the file tracing from the state of a deleted file to the preceding state.

At the step 230, a comparison result obtained at the step 201 is examined to determine whether or not the name of a file has been changed. If the name of a file has been changed, the PAD flow goes on to the step 211. At the step 211, the file transition entries of the directory state transition repository are searched for the same file name existing in the past. After the search is completed, the PAD flow goes on to the step 212. At the step 212, a search result obtained at the step 211 is examined to determine whether or not the same file name existed in the past. If the same file name existed in the past, the PAD flow goes on to the step 231. If the same file name did not exist in the past, on the other hand, the PAD flow goes on to the step 215. At the step 231, a state indicating that a file name has been changed from one to another is added as a file transition entry to the directory state transition repository. At the next step 214, a reference remark is added to the file transition entry added at the step 231 as a remark indicating an opposite direction of the file tracing from the state indicated by the file transition entry added at the step 231 to the preceding state. Then, at the next step 215, a new file transition entry for the new file is created in the directory state transition repository to indicate that the name of a file has been changed from one to another. After the step 230 is ended, the PAD flow goes on to the step 202. At the step 202, a seek operation to find the next block is carried out.

In the subroutine executed at the step 140 of FIG. 1, meta information used as management information of the file is checked for a change. The management information of a file includes a correction time of the file and the value of the LBA of each block for storing contents of the file. Much like the subroutine executed at the step 130, the pre-updating contents of a block for storing meta information are compared with the post-updating contents of the block to determine what kind of updating has been carried out. At the step 301 of the subroutine executed at the step 140 of FIGS. 1 and 3, a state existing before updating of meta information of the file is compared with a state existing after the updating of the meta information. The meta information of a file can be identified by using the identifier of the file. Thus, pieces of meta information recorded previously are searched for a piece having the same identifier as the object of the analysis, and the meta information found in the search is compared with that of the object of the analysis. This comparison can be carried out due to the fact that data has been written on the storage medium employed in the disk drive by execution of the WORM control. After the step 301 is ended, the PAD flow goes on to the step 310. At the step 310, a change point recognized at the step 301 is examined to determine whether or not the meta information of the file has been updated. If the meta information of the file has been updated, the PAD flow goes on to the step 311. At the step 311, a state indicating the change point of the meta information used as the management information is added as a new file transition entry to the directory state transition repository. As described above, examples of the management information include a correction time of the file and the value of the LBA of each block for storing contents of the file.

The meta information of a file is information, which is updated every time an access is made to the file. Thus, in order to enhance the performance of the file system, the meta information is normally stored in a cache memory of the host. In consequence, it is quite within the bounds of possibility that, at a stage of saving contents of a file in a block, the meta information stored in the cache memory is not reflected in the block. Thus, if an analysis of the contents of a block is made by execution of the WORM control in an order the contents were written into the storage medium employed in the disk drive, in some cases, it is impossible to determine which file includes contents stored in the block. In order to solve this problem, this embodiment is provided with two different types of repository for managing an LBA in dependence on whether or not it is possible to identify which file includes contents stored at the LBA from the meta information.

If it is possible to identify which file includes contents stored at an LBA from the meta information, the LBA is managed by using an LBA state transition repository provided for blocks specified in the file state transition repository. The LBA state transition repository provided for blocks specified in the file state transition repository is used for cataloging changes with regard to such LBAs every time the contents of the file are updated. If it is impossible to identify which file includes contents stored in a block at an LBA from the meta information, on the other hand, the LBA is cataloged in an LBA state transition repository for managing only such LBAs. Then, as will be described later, at a certain stage, it becomes possible to identify which file includes contents stored at such an LBA. At this stage, the entry for such an LBA is moved from the LBA state transition repository for managing only such LBAs to the LBA state transition repository provided for blocks specified in the file state transition repository.

After the step 311 is ended, the PAD flow goes on to the step 312 at which the LBA state transition repository for managing only LBAs of blocks each used for storing contents of an unidentifiable file is searched for an LBA block entry including an LBA in meta information. After the step 312 is ended, the PAD flow goes on to the step 313 to determine whether or not the LBA in meta information has been found in the search. If the LBA in meta information has been found in the search, the PAD flow goes on to the step 314. At the step 314, the entry of the LBA found in the search is moved from the LBA state transition repository for managing only LBAs of blocks each used for storing contents of an unidentifiable file to the LBA state transition repository provided for blocks specified in the file transition entries of a file state transition repository. After the step 314 is ended, the PAD flow goes on to the step 315. At the step 315, the LBA block entry moved from the LBA state transition repository for managing only LBAs of blocks each used for storing contents of an unidentifiable file to the LBA state transition repository provided for blocks specified in the file transition entries of a file state transition repository is searched for the LBA of a block for storing the tail of the file. After the step 315 is ended, the PAD flow goes on to the step 316. At the step 316, the result of the search is examined to determine whether or not the LBA of the block for storing the tail of a file is included in the LBA block entry. If the LBA of the block for storing the tail of a file is included in the LBA block entry, the PAD flow goes on to the step 317. At the step 317, a consistency flag is added to a management area of the rearmost block of the file as a flag indicating that the rearmost block is the end block of the file. By identifying which block is the end block of a file for every file in this way, an operation to write data into a file in the disk drive can be invalidated with consistency sustained.

After the step 313 is ended, the PAD flow goes on to the step 318. At the step 318, consistency is verified by using meta information added at the step 311 and information recorded in the flag area 811 of the block and by comparing the updating order becoming obvious from the analysis of the meta information with the actual block-updating order. A result of verification is then added to the file state transition directory.

In the disk drive according to the present embodiment, information stored in the flag area 811 of a block can be referred to by the host but cannot be updated thereby. An example of the information stored in the flag area 811 is shown in FIG. 9. In the case of an example 910, a time at which the disk drive writes data into the block is recorded in the flag area as an integer with a length of 4 bytes. The recorded time may be a time synchronized with the real-world time such as the Greenwich standard time or a cumulative operating time lapsing since the initial power-on time. In the case of an example 920, the total number of write commands each issued for writing data into a block is recorded in the flag area as an integer with a length of 4 bytes. The value recorded in the flag area is obtained by counting the cumulative number of write commands issued since the disk drive was turned on for the first time. If the size of user data 801 stored in one block is 512 bytes, the integer with a length of 4 bytes can be used for expressing a total number of write commands for writing data of up to 2T bytes. In the case of an example 930, both the time at which the disk drive writes data into the block and the total number of write commands are recorded in the flag area. In the case of an example 940, besides the data of the example 930, the number of write commands issued for the block associated with the flag number is also recorded in the flag area as an integer with a length of 2 bytes.

As described above, information stored in the flag area 811 can be referred to by the host but cannot be updated thereby. Thus, by checking consistency between the meta information and the information recorded in a flag area, it is possible to determine whether or not data has been falsified illegally.

After the step 318 of FIG. 3 is ended, the PAD flow goes on to the step 214 of FIG. 2. At the step 214, a reference remark is added as a remark indicating an opposite direction from the state cataloged at the step 311 to the previous state. After the step 310 is ended, the PAD flow goes on to the step 202. At the step 202, a seek operation to find the next block is carried out.

In the subroutine executed at the step 150 of FIG. 1, a change made to every block is examined. In an operation to write data from the host into a file in the storage medium employed in the disk drive through the file system, the value of an LBA, at which the contents of the file are stored, is recorded in meta information of the file. Thus, by referring to the meta information of a file, it is possible to determine which LBA of the file has its data changed. Every time an access is made to a file, an access time attribute of the meta information of the file is updated. If an update resulting from an access to a file is reflected in the disk drive every time such an access is made, however, the performance of the file system will deteriorate considerably. In order to solve this problem, updates of the meta information are stored for the time being in a cache on the host side before the updates are eventually transferred to the disk drive. In consequence, however, if blocks in the storage medium employed in the disk drive are analyzed in the same order pieces of data were written into the storage medium by execution of the WORM control, in some cases, it is impossible to determine which file includes contents stored in a block serving as the object of the analysis. In order to solve this problem, in this embodiment, when the host writes data into a block serving as the object of the analysis by specifying an LBA and it is possible to identify which file includes contents stored at the LBA, a state indicating that data has been written into the block is added to the LBA state transition repository provided for blocks specified in the file state transition repository for the file. Otherwise, a new LBA state transition repository for managing only LBAs of blocks each used for storing contents of an unidentifiable file is created independently of the file state transition repositories and the state indicating that data has been written into the block is added to the new LBA state transition repository.

At the step 401 of the subroutine executed at the step 150 of FIGS. 1 and 4, an LBA state transition repository provided for blocks specified in the file transition entries of a file state transition repository is searched for the LBA of a block serving as the object of the analysis. After the step 401 is ended, the PAD flow goes on to the step 410. At the step 410, a result of the search carried out at the step 401 is examined to determine whether or not the LBA of a block serving as the object of the analysis has been already cataloged in the LBA state transition repository. If such an LBA has already been cataloged in the LBA state transition repository, the PAD flow goes on to the step 411. If such an LBA has not already been cataloged in the LBA state transition repository, on the other hand, the PAD flow goes on to the step 416.

At the step 411, information associated with a block serving as the object of the analysis is added to the LBA state transition repository provided for blocks specified in the file transition entries of a file state transition repository. The added information is information read out from the flag area 811 of the block serving as the object of the analysis. Then, the PAD flow goes on to the step 412.

At the step 412, consistency between a file-updating order indicated by meta information as a file-updating order of the identified file and information read out from the flag area 811 cataloged at the step 411 is checked and a result of the checking is cataloged on the LBA state transition repository. Assume for example that files A and B in the storage medium have been updated and, in accordance with records included in meta information, file B was updated after file A while the information read out from the flag area 811 indicates that file A was updated after file B. In this case, file A is determined to be a file falsified by using an illegal means. After the step 412 is ended, the PAD flow goes on to the step 413.

At the step 413, a reference remark indicating an opposite direction from the state cataloged at the step 411 to a preceding state is added. After the step 413 is ended, the PAD flow goes on to the step 414.

At the step 414, the block serving as the object of the analysis is examined to determine whether or not the block is the last block for recording the end of the contents of the file. If the block serving as the object of the analysis is determined to be the last block for recording the end of the contents of the file, the PAD flow goes on to the step 415. At the step 415, a consistency flag is added to a management area of the block serving as the object of the analysis. The consistency flag is a flag indicating that the block serving as the object of the analysis is the last block for recording the end of the contents of the file. By identifying which block is used as the last block for recording the end of the contents of a file for each file in this way, it is possible to invalidate an operation to write data into a file of the storage medium employed in the disk drive in order to sustain consistency.

Then, at the step 416, a new entry is added to an LBA state transition repository for managing only LBAs of blocks each used for storing contents of an unidentifiable file. Then, information is read out from the flag area 811 of the block serving as the object of the analysis and cataloged in the entry.

As described above, by collecting LBAs not cataloged in meta information in an LBA state transition repository for managing only LBAs of blocks each used for storing contents of an unidentifiable file, tracing prior to cataloging an LBA in meta information is possible even for an operation of saving contents.

After the step 410 is ended, the PAD flow goes on to the step 202. At the step 202, a seek operation to find the next block is carried out.

By referring to FIGS. 5 and 6, the following description explains a method of detecting a falsification of a specific file. In the method of adding data to a history of write operations as explained earlier by referring to FIGS. 1 to 4, write operations are divided into directory and file operations. Thus, in analyses of data written into the storage medium employed in the disk drive by execution of the WORM control, detection of file falsification can be divided into file falsification detection at the directory-operation level and file falsification detection at the file-operation level. To put it in detail, in the file falsification detection at the directory-operation level, the existence of file replacement is checked. In the file falsification detection at the file-operation level, on the other hand, the existence of replacement of a data block for recording contents of a file is checked. All data necessary for determining whether or not data was falsified has already been collected by adoption of a method to trace a history of write operations as explained earlier by referring to the PAD diagrams shown in FIGS. 1 to 4. Thus, in operations represented by PAD diagrams shown in FIGS. 5 and 6, a file to serve as an object of falsification detection is specified and the substance of a falsification detected as a result of history-tracing analyses is read out and output to a console.

When the user enters the path name of an object of falsification detection to the path-name input unit 601 of the console and operates the command button 602, at the step 501 of the falsification detection method, the path name specified by the user is input. After the step 501 is ended, the PAD flow goes on to the step 510.

At the step 510, analysis results produced by implementation of the write-history-tracing method 100 are looped in a reversed order starting from the most recent state of the file to preceding states. If the file has been falsified, examination of change points of the file by tracing them from the most recent state back to preceding states makes it possible to determine whether or not the file has been falsified in a short period of time. Then, the PAD flow goes to the step 511. At the step 511, a history of directory operations currently being processed is examined to determine whether or not the history agrees with the path name specified at the step 501. If they match each other, the PAD flow goes on to the step 512. At the step 512, the substance of a file operation is read out from a file transition entry included in the directory state transition repository analyzed in the subroutine 130 as the file transition entry for the specified file. The file operation read out at this step typically includes a file creation, a file deletion or a modification of a file name. After the step 512 is ended, the PAD flow goes on to the step 513. At the step 513, the fetched substance of the operation is output to the console. After the step 513 is ended, the PAD flow goes on to the step 531. At the step 531, information on consistency of the history of meta-information updating is read out from the directory state transition repository in the same way as the step 512. After the step 531 is ended, the PAD flow goes on to the step 532. At the step 532, the information on the consistency of the history of meta-information updating is output to the console.

After the loop executed at the step 510 is ended, the PAD flow goes on to a loop executed at the step 520. In the loop executed at the step 520, for each substance of the operation read out in the loop executed at the step 510, the contents of a file for the substance of the operation are read out from the storage medium. The steps 527, 538, 533 and 534 of the loop executed at the step 520 are executed as long as a fetched substance of the operation exists.

When an existing file is deleted, being replaced with a new file, the WORM control program 702 is capable of tracing contents of both the files. At the step 527, a difference at a file level between the existing and replacing files is extracted by using the function of the control program 702. After the step 527 is ended, the PAD flow goes on to the step 528. At the step 528, the file difference is output to the console. After the step 528 is ended, the PAD flow goes on to the step 533. At the step 533, information on file consistency is read out from the LBA state transition repository provided for blocks specified in the file state transition repository. Then, the PAD flow goes on to the step 534. At the step 534, the fetched information on the consistency is output to the console.

In this embodiment, the host executes the WORM program 702 to save a history of all write operations in the disk drive 710. If a user operating the host falsifies data in the storage medium employed in the disk drive 710 by using a normal path from the host, a history of all falsifications will be left in the disk drive 710. In this case, from a history of meta-information updating and a history of contents updating, a falsification and the substance of the falsification can be detected. If data in the storage medium employed in the disk drive 710 is falsified by not using the normal access path, on the other hand, by checking consistency between information recorded in the flag area 811 and meta information and/or contents, the falsification can be detected. Typically, the consistency is checked as below. Assume that files A and B have been stored into the storage medium employed in the disk drive and a result of analyzing meta information indicates that file A should have been recorded in the storage medium ahead of file B by one month. In this case, if file A has been actually recorded in the storage medium after file B, file A is determined to be an falsified file. Even if data is changed in the course of an operation to copy the entire data stored in the storage medium employed in the disk drive 710, from information recorded in the flag area 811, it is possible to determine that the change has been made in a burst operation within a short period of time. Thus, the copy of the storage medium employed in the disk drive 710 can be detected.

In order to show information on a difference from consistency of meta information and contents, the console is provided with a consistency display area and a difference display area for each of the meta information and the file contents. To be more specific, a difference display area 603 for meta information displays a result output to the console at the step 513. A directory-operation display area 610 is used to specify a directory operation, the difference for which is to be displayed. The directory-operation display area 610 for displaying directory operations comprises an operation-type display column 611 for displaying the substance of each directory operation and a consistency-information display column 612 for displaying the consistency information of each directory operation. If the user looks at the substance of each directory operation in the operation-type display column 611 and selects a directory operation as shown by a black row 613, a difference in meta information between the selected directory operation and the preceding operation is displayed in the difference display area 603 for meta information. In addition, by selecting the directory operation as described above, a difference between files before and after the selected directory operation is displayed in a difference display area 604 for file contents. On the top of that, by selecting the directory operation as indicated by the black row 613, a display area 620 of blocks each used for recording contents of a file subjected to the selected directory operation shows information on consistency for the blocks each used for recording the contents.

In addition, if a falsification is detected, a state to be restored can be selected by specifying a black row 613 and, by operating a data-invalidating button 605, a command to invalidate data is given to the WORM control program 702. In accordance with this command, the WORM control program 702 invalidates all write operations carried out in and prior to the state selected by the black row 613.

Next, a typical display of the console is explained by referring to FIG. 23. The file transition entries 2118 and 2119 of FIG. 21 correspond to rows 2301 and 2302 respectively. The contents of the file transition entry 2118 are changed to those in the entry 2119 in spite of the fact that the timestamp remains the same. Thus, in the consistency-information display column 612 for directory operations, the rows 2301 and 2302 each display an NG mark. By selecting the row 2302, the difference display area 603 for meta information displays an inconsistency cause, which is the fact that the contents of the file transition entry 2118 are changed to those in the entry 2119 in spite of the fact that the timestamp remains the same. In an LBA display column 621 for blocks, a row 2303 displays an NG mark on a consistency display column 622 for blocks to indicate the existence of an inconsistency problem, which is discontinuity of a value recorded in the flag area 811 of an LBA of 3078 in an entry 2212 with values recorded in the flag areas 811 of the three remaining LBAs of 3076, 3077 and 3079 forming a block of the entry 2212 in conjunction with the LBA of 3078. The file-difference display area 604 displays a difference between the entries 2301 and 2302, that is, the fact that a block 623 has changed to a block 961.

In this embodiment of the present invention, as directory operations, only file creations, file deletions and file-name modifications are dealt with and as a file operation, only an operation to add information on a block for recording contents of a file to meta information is handled. However, the directory and file operations can be extended with ease to include an operation to change a variety of attributes such as the time it takes to make an access to a file.

In the description of this embodiment, a method provided by the present invention is explained by taking the file system as an example. In addition to the file system, however, the method can be applied with ease to any other recording technique for saving data in the storage medium of a disk drive in a kind of data structure as is the case with a database.

In the case of a write operation from the host through a normal access path, with the method disclosed in Japanese Patent Laid-open No. 10-283262, it is possible to determine whether or not a falsification exists. In accordance with the present invention, on the other hand, even the substance of a falsification can be recognized. In addition, in the case of a write operation not carried out from the host through an illegal access path, with the method disclosed in Japanese Patent Laid-open No. 10-283262, it is not possible to determine even whether or not a falsification exists. In accordance with the present invention, on the other hand, it is possible to determine whether or not a falsification exists as a result of such an illegal write operation.

In the case of the present embodiment, in order to detect a falsification, it is necessary to merely read out only meta information of a file and a value recorded in a flag area 811. If contents are managed by using meta information with a size of 4 B in units of 4 KB, for example, the size of the meta information is $\frac{1}{1000}$ times the size of the unit used in the management. Thus, in comparison with the method disclosed in Japanese Patent Laid-open No. 11-261550, the time it takes to detect a falsification can be reduced to at least $\frac{1}{1000}$ times.

In addition, the method disclosed in Japanese Patent Laid-open No. 11-261550 absolutely requires an external recognition engine. On the other hand, the present invention can be applied even in a standalone environment.

Second Embodiment

FIG. 11 is a PAD diagram referred to in explaining a method of tracing a history of write operations in accordance with a second embodiment of the present invention. In FIG. 11, reference numeral 1100 denotes the PAD diagram referred to in explaining the method of tracing a history of write operations in accordance with a second embodiment implementing a disk-drive control method and a falsification detection method, according to the present invention. Reference numeral 1110 denotes the step of determining whether or not a result of an analysis made previously exists. Reference numeral 1111 denotes the step of fetching a result of an analysis made previously. Reference numeral 1112 denotes the step of fetching analysis resumption information required for starting an analysis as a continuation of the immediately preceding analysis. Reference numeral 1113 denotes the step of fetching the data structure of data recorded on the storage medium employed in the disk drive. Reference numeral 1114 denotes the step of setting an analysis program for tracing a history of write operations. Reference numeral 1115 denotes the step of an operation to seek the storage medium employed in the disk drive for the beginning of the storage medium. Reference numeral 1116 denotes the step of allocating a location for saving a result of an analysis. Reference numeral 1117 denotes the step of writing a result of an analysis. Reference numeral 1118 denotes the step of writing analysis resumption information required for starting a next analysis as a continuation of the immediately preceding analysis in making the next analysis. Reference numeral 1119 denotes the step of recording an error. Reference numeral 1120 denotes the step of executing a loop in a range of PBAs (Physical Block Addresses) of an analysis-object block included in the storage medium employed in the disk drive as a block into which data has already been written. Reference numeral 1121 denotes the step of determining whether or not an operation carried out on a block serving as an object of the analysis is a directory operation. Reference numeral 1122 denotes the step of determining whether or not an operation carried out on a block serving as an object of the analysis is a file operation. Reference numeral 1123 denotes the step of determining whether or not an operation carried out on a block serving as an object of the analysis is an block operation. Reference numeral 1130 denotes a subroutine for a case in which an operation carried out on a block serving as the object of the analysis is a directory operation. Reference numeral 1140 denotes a subroutine for a case in which an operation carried out on a block serving as the object of the analysis is a file operation. Reference numeral 1150 denotes a subroutine for a case in which an operation carried out on a block serving as the object of the analysis is a block operation.

FIG. 12 is a PAD diagram referred to in explaining the subroutine 1130 according to the second embodiment of the present invention. In FIG. 12, reference numeral 1200 denotes the subroutine 1130 provided by the second embodiment implementing a disk-drive control method and a falsification detection method, according to the present invention. Reference numeral 1201 denotes the step of comparing a block serving as an object of the analysis with a block experiencing a previous write operation specifying the same LBA as the block serving as an object of the analysis. Reference numeral 1201 may also denote the step of comparing a block serving as an object of the analysis with a block including recorded meta information corresponding to the same directory name as a directory name corresponding to meta information recorded in the block serving as an object of the analysis. Reference numeral 1202 denotes the step of seeking for the next block. Reference numeral 1210 denotes the step of determining whether or not the write operation is a file creation. Reference numeral 1211 denotes the step of searching for a file name existing in the past as a file name identical with the name of a file serving as the object of the analysis. Reference numeral 1212 denotes the step of determining whether or not the identical file name exists on the basis of a result of the search. Reference numeral 1213 denotes the step of adding an item to existing file transition entries of the directory state transition repository as a file transition entry item for saving a result of an analysis. Reference numeral 1214 denotes the step of adding a reference remark indicating an opposite direction to a file transition entry. Reference numeral 1215 denotes the step of creating a new file transition entry in the directory state transition repository. Reference numeral 1220 denotes the step of determining whether or not the write operation is a file deletion. Reference numeral 1221 denotes the step of adding a file transition entry of a file deletion to the directory state transition repository. Reference numeral 1230 denotes the step of determining whether or not the write operation is an operation to change the name of a file. Reference numeral 1231 denotes the step of adding a file transition entry of a file-name modification to the directory state transition repository.

FIG. 13 is a PAD diagram referred to in explaining the subroutine 1140 according to the second embodiment of the present invention. In FIG. 13, reference numeral 1300 denotes the PAD diagram referred to in explaining the subroutine 1140 provided by the second embodiment implementing a disk-drive control method and a falsification detection method, according to the present invention. Reference numeral 1301 denotes the step of comparing a previous LBA state of a block serving as the object of the analysis with the present state. Reference numeral 1310 denotes the step of checking whether or not meta information of a file has been updated. Reference numeral 1311 denotes the step of adding an operation to update meta information as a file transition entry to the directory state transition repository. Reference numeral 1312 denotes the step of searching an LBA (Logical Block Address) state transition repository provided for blocks specified in the file transition entries of a file state transition repository for an LBA in meta information. Reference numeral 1313 denotes the step of determining whether or not an LBA in meta information has already been cataloged in the LBA state transition repository provided for blocks specified in the file transition entries of a file state transition repository. Reference numeral 1314 denotes the step of moving an LBA block entry from the LBA state transition repository for managing only LBAs of blocks each used for recording contents of an unidentifiable file to an LBA state transition repository provided for blocks specified in the file transition entries of a file state transition repository. Reference numeral 1315 denotes the step of searching an LBA block entry moved from an LBA state transition repository for managing only LBAs of blocks each used for recording contents of an unidentifiable file to an LBA state transition repository provided for blocks specified in the file transition entries of a file state transition repository for the LBA of a block for storing the tail of a file. Reference numeral 1316 denotes the step of determining whether or not the LBA of a block for storing the tail of a file is included in an LBA block entry moved from an LBA state transition repository for managing only LBAs of blocks each used for recording contents of an unidentifiable file to an LBA state transition repository provided for blocks specified in the file transition entries of a file state transition repository. Reference numeral 1317 denotes the step of adding a consistency flag to a management area of a rearmost block composing a file.

FIG. 14 is a PAD diagram referred to in explaining the subroutine 1150 according to the second embodiment of the present invention. In FIG. 14, reference numeral 1400 denotes the PAD diagram referred to in explaining the subroutine 1150 provided by the second embodiment implementing a disk-drive control method and a falsification detection method, according to the present invention. Reference numeral 1401 denotes the step of searching an LBA state transition repository provided for blocks specified in the file transition entries of a file state transition repository for the LBA of a block serving as the object of the analysis. Reference numeral 1410 denotes the step of determining whether or not the LBA of a block serving as the object of the analysis has been cataloged in an LBA state transition repository provided for blocks specified in the file transition entries of a file state transition repository. Reference numeral 1411 denotes the step of adding information associated with a block serving as the object of the analysis to an LBA state transition repository provided for blocks specified in the file transition entries of a file state transition repository. Reference numeral 1412 denotes the step of adding a reference remark indicating an opposite direction to an LBA block entry of an LBA state transition repository provided for blocks specified in the file transition entries of a file state transition repository. Reference numeral 1413 denotes a step of adding information on a file identifier to a management area of a block serving as the object of the analysis. Reference numeral 1414 denotes the step of determining whether or not a block serving as the object of the analysis is the last block for recording the end of the contents of a file. Reference numeral 1415 denotes the step of adding a consistency flag to a management area of the last block composing a file. Reference numeral 1420 denotes the step of determining whether or not the LBA of a block serving as the object of the analysis is an LBA appearing for the first time. Reference numeral 1421 denotes the step of creating a new entry in an LBA state transition repository for managing only LBAs of blocks each used for storing contents of an unidentifiable file. Reference numeral 1422 denotes the step of adding information to an LBA block entry of an LBA state transition repository for managing only LBAs of blocks each used for storing contents of an unidentifiable file. Reference numeral 1423 denotes the step of adding a reference remark indicating an opposite direction to an LBA block entry of an LBA state transition repository for managing only LBAs of blocks each used for storing contents of an unidentifiable file.

FIG. 15 is a PAD diagram referred to in explaining a method according to the second embodiment of the present invention as a method of detecting a falsification of a file. In FIG. 15, reference numeral 1500 denotes the PAD diagram referred to in explaining the method of detecting a falsification of a file in accordance with the second embodiment implementing a disk-drive control method and a falsification detection method, which are provided by the present invention. Reference numeral 1501 denotes the step of specifying a path name. Reference numeral 1510 denotes the step of looping a history of directory operations in a reversed order. Reference numeral 1511 denotes the step of determining whether or not a path name is the specified path name. Reference numeral 1512 denotes the step of reading out a substance of the operation from the history of directory operations. Reference numeral 1513 denotes the step of outputting the fetched substance of the operation to a console. Reference numeral 1520 denotes the step of executing a loop as long as a fetched substance of the operation exists. Reference numeral 1521 denotes the step of executing a loop for blocks each used for recording contents of a file specified by a file transition entry. Reference numeral 1522 denotes the step of executing a loop in the reversed direction on blocks having the same LBA. Reference numeral 1523 denotes the step of reading out the contents of a block from the storage medium. Reference numeral 1524 denotes the step of reading out contents stored previously in a block at the same LBA. Reference numeral 1525 denotes the step of extracting a difference in contents between the current block and the block experiencing a write operation previously. Reference numeral 1526 denotes the step of outputting the fetched difference in contents between blocks to a console. Reference numeral 1527 denotes the step of extracting a difference at a file level between replaced and replacing files. Reference numeral 1528 denotes the step of outputting the file difference to a console.

Figure 16:
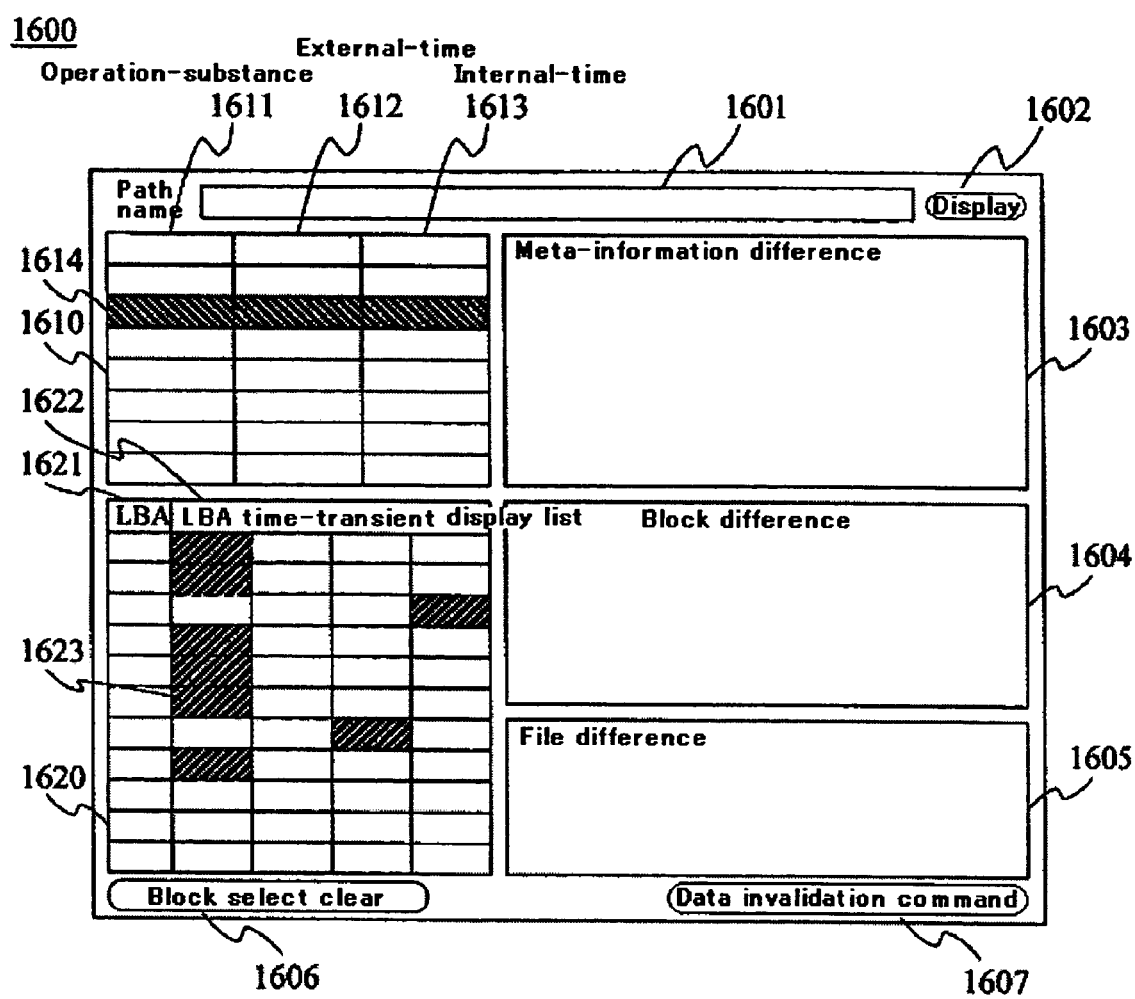
FIG. 16 is a diagram showing a screen appearing on a display unit of a console as a screen according to the second embodiment of the present invention.

FIG. 16 is a diagram showing a screen appearing on the display unit of a console as a screen provided by the second embodiment of the present invention. In FIG. 16, reference numeral 1600 denotes the display screen of the console as a screen provided by the second embodiment implementing a disk-drive control method and a falsification detection method, in accordance with the present invention. Reference numeral 1601 denotes an input portion for inputting a path name and reference numeral 1602 denotes a command button for making a request for an analysis-result display corresponding to the path name. Reference numeral 1603 denotes a display area for displaying a meta-information difference and reference numeral 1604 denotes a display area for displaying a difference between blocks. Reference numeral 1605 denotes a display area for displaying a file difference and reference numeral 1606 denotes a block select clear button. Reference numeral 1607 denotes a command button for making a request for data invalidation and reference numeral 1610 denotes a directory-operation display area. Reference numeral 1611 denotes a display column for displaying the substance of each directory operation and reference numeral 1612 denotes a display column for displaying the external time of each directory operation. Reference numeral 1613 denotes a display column for displaying the internal time of each directory operation. Reference numeral 1614 denotes a row of a selected directory operation and reference numeral 1620 denotes a display area for displaying blocks each used for recording contents of a file. Reference numeral 1621 denotes a display column for displaying the LBA of each block for recording contents of a file. Reference numeral 1622 denotes a display column for displaying a time transient of the LBA of each block for recording contents of a file. Reference numeral 1623 denotes a selected box representing a block at an LBA as a block for recording contents of a file.

Figure 17:
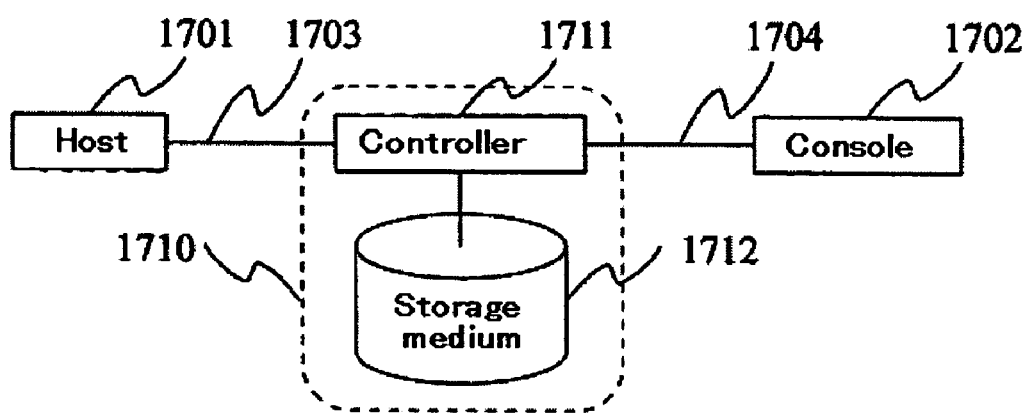
FIG. 17 is a diagram showing the configuration of a system according to the second embodiment of the present invention.

FIG. 17 is a diagram showing the configuration of a system according to the second embodiment of the present invention. In FIG. 17, reference numeral 1700 denotes the system provided by the second embodiment implementing a disk-drive control method and a falsification detection method, in accordance with the present invention. Reference numerals 1701 and 1702 denote a host and a console respectively. Reference numeral 1703 denotes an access made from the host 1701 to a disk drive through a block interface. Reference numeral 1704 denotes an access made from the console 1702 through a management interface. Reference numeral 1710 denotes the disk drive and reference numeral 1711 denotes a controller employed in the disk drive 1710. Reference numeral 1712 denotes the storage medium employed in the disk drive 1710.

Figures 24, 25:
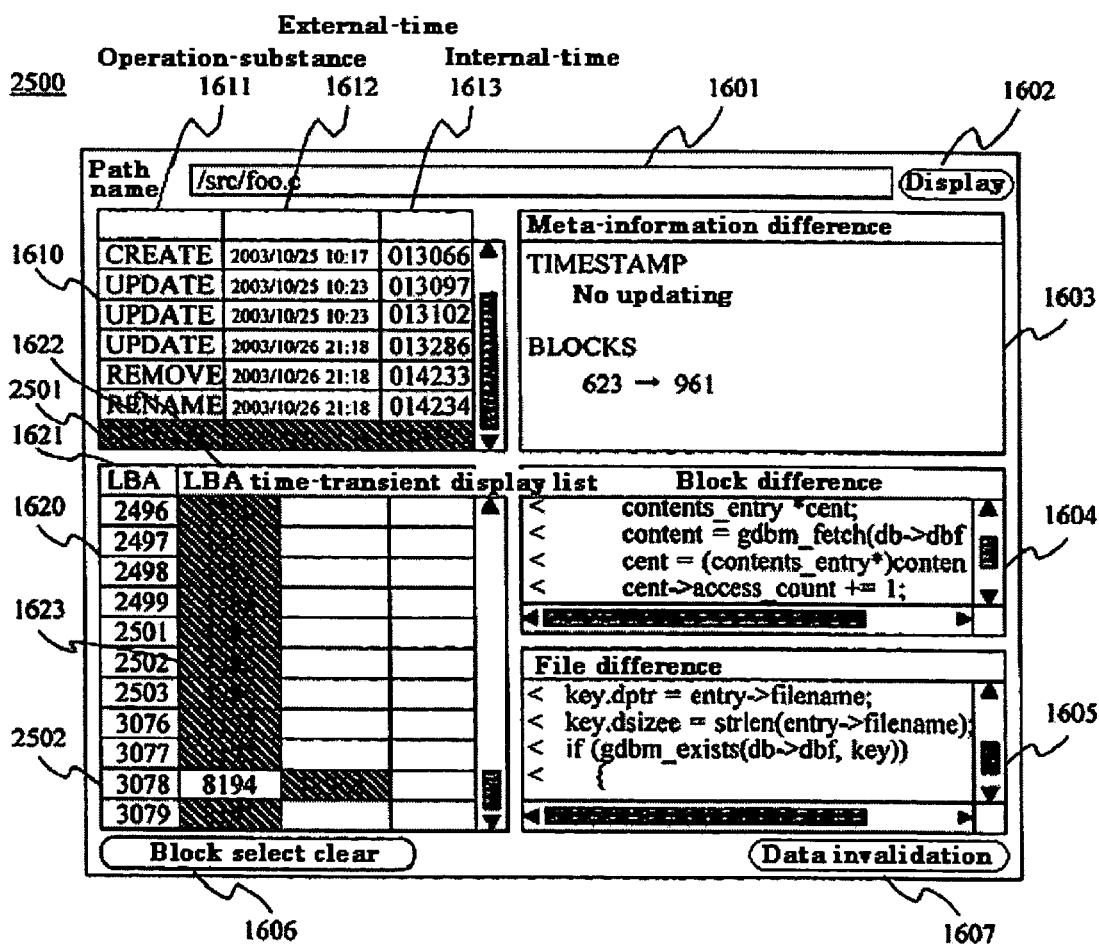
FIG. 24 is a diagram showing the data structure of an LBA state transition repository provided for blocks specified in the file transition entries of a file state transition repository as an LBA state transition repository according to the second embodiment of the present invention.
FIG. 25 is a diagram showing a typical screen appearing on the display unit of a console as a screen according to the second embodiment of the present invention.

FIG. 24 is a diagram showing the data structure of an LBA state transition repository associated with blocks specified in the file transition entries of a file state transition repository as an LBA state transition repository according to the second embodiment of the present invention. In FIG. 24, reference numeral 2400 denotes the LBA state transition repository. Reference numeral 2401 denotes a column showing the index number of each block for recording contents of a file. Reference numeral 2402 denotes a column showing LBAs and PBAs each enclosed in parentheses as PBAs associated with the LBAs. The LBAs and the PBAs in each entry (row) are addresses of sectors composing a block indicated by the index number in the same entry as the LBAs and the PBAs.

Reference numeral 2403 denotes an entry including the LBA and PBA of every sector for recording the contents of a block indicated by a block number of 204. In the same way, reference numeral 2404 denotes an entry including the LBA and PBA of every sector for recording the contents of a block indicated by a block number of 251. Likewise, reference numeral 2405 denotes an entry including the LBA and PBA of every sector for recording the contents of a block indicated by a block number of 516. Similarly, reference numeral 2406 denotes an entry including the LBA and PBA of every sector for recording the contents of a block indicated by a block number of 538. By the same token, reference numeral 2407 denotes an entry including the LBA and PBA of every sector for recording the contents of a block indicated by a block number of 621. In the same way, reference numeral 2408 denotes an entry including the LBA and PBA of every sector for recording the contents of a block indicated by a block number of 622. Likewise, reference numeral 2409 denotes an entry including the LBA and PBA of every sector for recording the contents of a block indicated by a block number of 623. Similarly, reference numeral 2410 denotes an entry including the LBA and PBA of every sector for recording the contents of a block indicated by a block number of 624. By the same token, reference numeral 2411 denotes an entry including the LBA and PBA of every sector for recording the contents of a block indicated by a block number of 625. In the same way, reference numeral 2412 denotes an entry including the LBA and PBA of every sector for recording the contents of a block indicated by a block number of 961. Likewise, reference numeral 2413 denotes another entry also including the LBA and PBA of every sector for recording the contents of a block indicated by a block number of 961.

FIG. 25 is a diagram showing a typical screen appearing on the display unit of a console as a screen according to the second embodiment of the present invention. In FIG. 25, reference numeral 2500 denotes the typical display screen of the console and reference numeral 2501 denotes a selected row of meta information. Reference numeral 2502 denotes a row including an LBA having a problem.

The first embodiment detects a falsification data stored in the storage medium employed in the disk drive through execution of the WORM control by the host. On the other hand, the second embodiment detects a falsification data stored in the storage medium employed in the disk drive through execution of the WORM control by the disk drive itself.

In the second embodiment, the host makes a normal block access such as an access through the SCSI, which is a representative interface for such accesses, to write data into or read out data from the storage medium employed in the disk drive by specifying an LBA (Logical Block Address). In a write operation, the disk drive prevents new data from being written over data already existing in the storage medium even if the LBA specified for the new data is the same as the LBA of the already existing data by associating the LBA specified for the new data with a PBA (Physical Block Address) different from the PBA of the existing data by dynamically modifying a relation associating LBAs with PBAs so that the new data is prevented from being stored at the PBA of the existing data. In a read operation, desired data stored at a PBA associated by the most recent relation with an LBA specified in the read operation is read out from the storage medium.

In a disk drive implementing read and write operations through a block interface, the data structure of data stored in the storage medium employed in the disk drive is known only by a host that wrote the data. Thus, in order to determine whether or not data stored in the storage medium employed in the disk drive has been falsified, it is necessary to store data through execution of the WORM control by dynamically changing a relation associating LBAs with PBAs and save a history of all write operations. In addition, it is also necessary to analyze the history of write operations by execution of an analysis program, which understands both the relation associating LBAs with PBAs and the structure of stored data.

In general, from a security point of view, it is undesirable to provide a path allowing an access to management information in the disk drive to be made from a host other than a service processor. From the security point of view, it is thus desirable to execute an analysis program in a controller employed in the disk drive or a service processor. In cases such as a case where an HDD executes the WORM control as a standalone unit, however, there may be no sufficient processor resources required for executing the analysis program. In such a case, it is necessary to provide a path that can be used for making an access to data such as the management information of the disk drive and execute the analysis program in a host connected to the disk drive.

In this embodiment, the analysis program is executed in the controller 1711 employed in the disk drive 1710, which records data onto a storage medium thereof by execution of the WORM control, as shown in FIG. 17. The disk drive 1710 comprises the controller 1711 and the storage medium 1712. When the host 1701 makes an access 1703 to the disk drive 1710 through a block interface, issuing a command to write data to the controller 1711, the controller 1711 writes the data into the storage medium 1712 by execution of the WORM control. On the other hand, the management console 1702 makes an access 1704 to the controller 1711 employed in the disk drive 1710 through a management interface to set parameters of the analysis program, issue a command to carry out an operation of detecting a falsification and output a result of detection.

The following description explains a method of detecting a falsification in a file system in accordance with this embodiment. However, the method can also be applied to any data such as a database as long as the data is stored to form a data structure.

By referring to FIGS. 11 to 14, the following description explains a method of tracing a write-operation history required for detecting a falsification in a file system. In a process to detect a falsification by tracing a history of write operations in an order pieces of data were written into the storage medium employed in the disk drive by execution of the WORM control, PBAs (Physical Block Addresses) of data already analyzed and an analysis result are saved so as to allow a new analysis to be started as a continuation of an immediately preceding analysis. In addition, if an analysis is suspended and resumed in this way, an analysis needs to be made only on contents recorded newly in the storage medium employed in the disk drive so as to give the effect of an ability to reduce the analysis time.

In order to resume the analysis as described above, at the step 1110, a management area of the disk drive 1710 is examined to determine whether or not a result of a previous analysis has been stored therein. If a result of a previous analysis has been stored in the management area, the PAD flow goes on to the step 1111. If no result of a previous analysis has been stored in the management area, on the other hand, the PAD flow goes on to the step 1113. At the step 1111, the result of an analysis made previously is fetched. Then, at the next step 1112, analysis resumption information required for starting an analysis as a continuation of the immediately preceding analysis is fetched. Subsequently, a seek operation is carried out to position the head to the PBA of the continuation of the immediately preceding analysis. The analysis resumption information includes at least setting data of the analysis program and the value of the PBA at which the immediately preceding analysis was completed.

The fact that no result of a previous analysis has been stored in the management area indicates that the analysis program has not been executed even once. Thus, in this case, the analysis program is set at the steps 1113, 1114 and 1115. The analysis program needs to be set for every data format, that is, for each file system kept in the disk drive 1710. A process of providing an analysis program for every file system stored in the disk drive 1710 takes a very large number of man-hours. In order to solve this problem, the analysis program is divided into two portions, i.e., (1) a definition portion for defining the data structure of a file system and (2) a search portion based on the definition of every defined data structure. In this way, a definition portion is prepared for every file system but only one search portion common to all file systems is required. At the step 1113, the data structure of a file system is loaded by the controller 1711 from a volume included in the disk drive 1710 as a volume serving as the object of the analysis in accordance with a command entered via the management console 1702. Then, at the next step 1114, the analysis program inputs the data structure loaded at the step 1113. Finally, at the next step 1115, a seek operation is carried out to position the head at the beginning of the volume serving as the object of the analysis.

At the step 1120 of FIG. 11, a loop is executed in a range of PBAs of an analysis-object block included in the storage medium employed in the disk drive as a block to which data has already been written. In this loop, an analysis is carried out in dependence on whether the write operation carried out on the block is a directory operation, a file operation or a block operation. This is because write operations carried out on the block through a file system can be classified into the following three categories:

(1) a directory operation of mainly to create or delete a file or a directory,
(2) a file operation to update meta information of a file and
(3) a block operation carried out on a block as a write operation other than the directory and file operations.

One of the three categories can be uniquely determined by a data structure loaded at the step 1113 as a category to which a write operation carried out on a block pertains. At the step 1121, the write operation carried out on the block is examined to determine whether or not the write operation is a directory operation. If the write operation carried out on the block is a directory operation, the PAD flows go on to the subroutine 1130. At the step 1122, the write operation carried out on the block is examined to determine whether or not the write operation is a file operation. If the write operation carried out on the block is a file operation, the PAD flows go on to the subroutine 1140. At the step 1123, the write operation carried out on the block is examined to determine whether or not the write operation is a block operation. If the write operation carried out on the block is a block operation, the PAD flows go on to the subroutine 1150. Finally, if the write operation carried out on the block is not a directory operation, a file operation and a block operation, the write operation can be interpreted as a generated error. In this case, the PAD flow goes on to the step 1119 at which the error is recorded. After the analysis in the loop executed at the step 1120 is ended for all PBAs each completing a write operation, the PAD flow goes on to the step 1116 at which a location for saving results of the analysis is allocated. Then, the PAD flow goes on to the step 1117 at which the results of the analysis are saved. Eventually, the PAD flow goes on to the step 1118 at which information necessary for resuming the analysis is saved.

To put it in detail, at the step 1116, a location for saving the results of the analysis is allocated in the management area allocated in the storage medium of the disk drive 1710 as an area specially used for detecting a falsification of data. Then, the PAD flow goes on to the step 1117. At the step 1117, the analysis results for the volume analyzed in the loop executed at the step 1120 are stored at the location allocated at the step 1116 in the management area. Then, the PAD flow goes on to the step 1118. At the step 1118, information necessary for resumption of the analysis from a PBA, for which the present analysis has been completed, is saved at the location allocated at the step 1116 in the management area in order to allow the next analysis to be made. The information saved as information necessary for resumption of the analysis includes at least the data set in the analysis program at the step 1114 and the value of a PBA completing the analysis made in the loop executed at the step 1120.

The subroutine executed at the step 1130 searches the directory structure for a change in directory structure as a change made through the file system. Such a change in directory structure is made as a result of creation of a file or a directory, deletion of a file or a directory or modification of the name of a file or a directory. In order to recognize a generated change in directory structure, it is necessary to check into an updating command issued by the host for a block for recording meta information as management information of directory entries. In accordance to the WORM control, data to be written into the storage medium employed in the disk drive in accordance with a write command specifying the same LBA as that of existing data is actually written at a PBA different from the PBA of the existing data. In the WORM control, the contents of a block at the LBA prior to the execution of the write command can thus be compared with the contents of another block at the same LBA after the execution of the write command. Thus, the disk drive is capable of determining what operation has been carried out on the directory. If a change in directory structure is recognized, in the same way as the first embodiment, the substance of the change is recorded in entries of a directory state transition repository and a file state transition repository, which are used for managing state changes of the disk drive. Assume for example that file A is newly created as a file pertaining to directory Dir. In this case, a state indicating that file A has been created is added as an entry to the directory state transition repository for directory Dir. After file A is newly created, a file state transition repository for file A is created and a state indicating that file A has been created is cataloged as an entry in the file state transition repository for file A.

Due to operations such an operation to change the name of a directory and an operation carried out by a file system to optimize locations of blocks, meta information of the directory is not necessarily stored at the same LBA. Thus, at the step 1201 of the subroutine executed at the step 1130 of FIGS. 11 and 12, first of all, an attempt is made to compare the block serving as the object of the analysis with a block completing a previous write operation carried out from the host by specifying the same LBA. If data recorded in the block completing the previous write operation is not previous meta information of a directory having the same directory name, previous meta information of a directory having the same directory name is found as meta information to be used in comparison. This comparison with a previous state of the block can be carried out due to the fact that the disk drive saves a history of write operations carried out in the past. After a point of change is detected in the comparison, the PAD flow goes on to the step 1210. At the step 1210, a result extracted at the step 1201 is examined to determine whether or not a file has been newly created. If a file has been newly created, the PAD flow goes on to the step 1211. After the processing of the step 1210 is ended, the PAD flow goes on to the step 1220.

If data is saved in an existing file by an application, the name of the previous contents of the file are left in a file serving as a backup with a different file name so that the existing file becomes a new file in some cases. Thus, in order to detect a falsification of a file having an old name, it is necessary to trace operations to update the file. At the step 1211, in order to implement this method by tracing operations to update a file, the file transition entries of the directory state transition repository are searched for the same file name existing in the past. After the search is completed, the PAD flow goes on to the step 1212. At the step 1212, the search result obtained at the step 1211 is examined to determine whether or not the same file name existed in the past. If the same file name existed in the past, the PAD flow goes on to the step 1213. If the same file name did not exist in the past, on the other hand, the PAD flow goes on to the step 1215. For example, assume that data is written into an existing file named A, and the previous contents of the file named A are retained in a new file named A.BACKUP. In this case, at the step 1213, a state indicating that a new file named A has been created is added to existing file transition entries included in the directory state transition repository as a new entry for the existing file named A. In addition, an entry indicating that the name of the existing file has been changed from A to A.BACKUP is added to the directory state transition repository.

If an analysis of blocks is made in an order the blocks were written into the storage medium employed in the disk drive, file transition entries of the directory state transition repository can be traced only in an order the files were updated. If it is desired to determine whether or not a specific file has been falsified, however, tracing the file from the most recent state to previous states is convenient. Thus, at the next step 1214, a reference remark is added to the file transition entry added at the step 1213 as a remark indicating an opposite direction of the file tracing from the state indicated by the file transition entry added at the step 1213 to the preceding state. At the next step 1215, a new file transition entry for the new file is created in the directory state transition repository to indicate that the new file has been created.

At the step 1220, a comparison result obtained at the step 1201 is examined to determine whether or not a file has been deleted. If a file has been deleted, the PAD flow goes on to the step 1221. After the step 1220 is ended, the PAD flow goes on to the step 1230. At the step 1221, a state indicating that a file has been deleted is added as a file transition entry to the directory state transition repository. Then, the PAD flow goes on to the step 1214. At the next step 1214, a reference remark is added to the file transition entry as a remark indicating an opposite direction of the file tracing from the state of a deleted file to the preceding state.

At the step 1230, a comparison result obtained at the step 1201 is examined to determine whether or not the name of a file has been changed. If the name of a file has been changed, the PAD flow goes on to the step 1211. At the step 1211, the file transition entries of the directory state transition repository are searched for the same file name existing in the past. After the search is completed, the PAD flow goes on to the step 1212. At the step 1212, the search result obtained at the step 1211 is examined to determine whether or not the same file name existed in the past. If the same file name existed in the past, the PAD flow goes on to the step 1231. If the same file name did not exist in the past, on the other hand, the PAD flow goes on to the step 1215. At the step 1231, a state indicating that a file name has been changed from one to another is added as a file transition entry to the directory state transition repository. At the next step 1214, a reference remark is added to the file transition entry added at the step 1231 as a remark indicating an opposite direction of the file tracing from the state indicated by the file transition entry added at the step 1231 to the preceding state. Then, at the next step 1215, a new file transition entry for the new file is created in the directory state transition repository to indicate that the name of a file has been changed from one to another. After the step 1230 is ended, the PAD flow goes on to the step 1202. At the step 1202, a seek operation to find the next block is carried out.

In the subroutine executed at the step 1140, meta information used as management information of the file is checked for a change. The management information of a file includes a correction time of the file and the LBA of each block for storing contents of the file. Much like the subroutine executed at the step 1130, the pre-updating contents of a block for storing meta information are compared with the post-updating contents of the block to determine what kind of updating has been carried out. Due to operations such an operation to change the name of a directory and an operation carried out by a file system to optimize locations of blocks, meta information of a file having the same name is not necessarily stored at the same LBA. For this reason, much like the step 1201 described earlier, at the step 1301 of the subroutine executed at the step 1140 of FIGS. 11 and 13, first of all, an attempt is made to compare the block serving as the object of the analysis with a block completing a previous write operation carried out from the host by specifying the same LBA. If data recorded in the block completing the previous write operation are not previous meta information of a file having the same file name, previous meta information of a file having the same directory name is found as meta information to be used in comparison. After the step 1301 is ended, the PAD flow goes on to the step 1310. At the step 1310, a change point extracted at the step 1301 is examined to determine whether or not the meta information of the file has been updated. If the meta information of the file has been updated, the PAD flow goes on to the step 1311. At the step 1311, a state indicating the change point of the meta information used as the management information is added as a new file transition entry to the directory state transition repository. As described above, examples of the management information include a correction time of the file and the LBA of each block for storing contents of the file.

In order to check whether or not the contents of a file have been updated, it is necessary to trace both transitions of LBA values in meta information and operations to write data at the same LBA and, for each block, to determine a file, the contents of which are recorded in the block. The meta information of a file is information, which is updated every time an access is made to the file. Thus, in order to enhance the performance of the file system, the meta information is normally stored in a cache memory of the host. In consequence, it is quite within the bounds of possibility that, at a stage of saving contents of a file in a block, the meta information stored in the cache memory is not reflected in the block. Thus, if an analysis of the contents of a block is made by execution of the WORM control in an order the contents were written into the storage medium employed in the disk drive, in some cases, it is impossible to determine which file includes contents stored in the block. In order to solve this problem, in this embodiment, as will be described later, if it is impossible to identify which file includes contents stored in a block at an LBA from the meta information, the LBA is cataloged in an entry created in an LBA state transition repository for managing only such LBAs. Then, at a certain stage of saving meta information, it becomes possible to identify which file includes contents stored at such an LBA. At this stage, the entry for such an LBA is moved to the LBA state transition repository provided for blocks specified in the file transition entries of the file state transition repository.

After the step 1311 is ended, the PAD flow goes on to the step 1312 at which the LBA state transition repository for managing only LBAs of blocks each used for storing contents of an unidentifiable file is searched for an LBA block entry including an LBA in meta information. After the step 1312 is ended, the PAD flow goes on to the step 1313 to determine whether or not the LBA in meta information has been found in the search. If the LBA in meta information has been found in the search, the PAD flow goes on to the step 1314. At the step 1314, the entry of the LBA found in the search is moved from the LBA state transition repository for managing only LBAs of blocks each used for storing contents of an unidentifiable file to the LBA state transition repository provided for blocks specified in the file transition entries of a file state transition repository. After the step 1314 is ended, the PAD flow goes on to the step 1315. At the step 1315, the LBA block entry moved from the LBA state transition repository for managing only LBAs of blocks each used for storing contents of an unidentifiable file to the LBA state transition repository provided for blocks specified in the file transition entries of a file state transition repository is searched for the LBA of a block for storing the tail of the file. After the step 1315 is ended, the PAD flow goes on to the step 1316. At the step 1316, the result of the search is examined to determine whether or not the LBA of the block for storing the tail of a file is included in the LBA block entry. If the LBA of the block for storing the tail of a file is included in the LBA block entry, the PAD flow goes on to the step 1317. At the step 1317, a consistency flag is added to a management area of the rearmost block of the file as a flag indicating that the rearmost block is the end block of the file. By identifying which block is the end block of a file for every file in this way, an operation to write data into a file in the disk drive can be invalidated with consistency sustained.

After the step 1313 is ended, the PAD flow goes on to the step 1214. At the step 1214, a reference remark is added as a remark indicating an opposite direction from the state cataloged at the step 1311 to the previous state. After the step 1310 is ended, the PAD flow goes on to the step 1202. At the step 1202, a seek operation to find the next block is carried out.

In the subroutine executed at the step 1150, a change made to every block is examined. In an operation to write data from the host into a file of the storage medium employed in the disk drive through the file system, the value of an LBA, at which the contents of the file are stored, is recorded in meta information of the file. Thus, by referring to the meta information of a file, it is possible to determine an LBA for the file. Every time an access is made to a file, an access time attribute of the meta information of the file is updated. If an update resulting from every access made to a file is reflected in the disk drive, however, the performance of the file system will deteriorate considerably. In order to solve this problem, updates of the meta information are stored for the time being in a cache on the host side before the updates are transferred to the disk drive. In consequence, however, if blocks in the storage medium employed in the disk drive are analyzed in the order pieces of data were written into the storage medium, in some cases, it is impossible to determine which file includes contents stored in a block serving as the object of the analysis. In order to solve this problem, in this embodiment, when the host writes data into a block serving as the object of the analysis by specifying an LBA and it is possible to identify which file includes contents stored at the LBA, a state indicating that data has been written into the block is added to the LBA state transition repository provided for blocks specified in the file transition entries of the file state transition repository for the file. Otherwise, a new LBA state transition repository for managing only LBAs of blocks each used for storing contents of an unidentifiable file is created independently of the file state transition repositories and the state indicating that data has been written into the block is added to the new LBA state transition repository.

At the step 1401 of the subroutine executed at the step 1150 of FIGS. 11 and 14, an LBA state transition repository provided for blocks specified in the file transition entries of a file state transition repository is searched for the LBA of a block serving as the object of the analysis. After the step 1401 is ended, the PAD flow goes on to the step 1410. At the step 1410, a result of the search carried out at the step 1401 is examined to determine whether or not the LBA of a block serving as the object of the analysis has been already cataloged in the LBA state transition repository. If such an LBA has already been cataloged in the LBA state transition repository, the PAD flow goes on to the step 1411. If such an LBA has not already been cataloged in the LBA state transition repository, on the other hand, the PAD flow goes on to the step 1420.

At the step 1411, the PBA (Physical Block Address) of a block serving as the object of the analysis is added to an LBA block entry of the LBA state transition repository provided for blocks specified in the file transition entries of a file state transition repository. Then, the PAD flow goes on to the step 1412. At the step 1412, a reference remark indicating an opposite direction from the state added at the step 1411 to a preceding state is added. Then, the PAD flow goes on to the step 1413. At the step 1413, the file identifier of the file associated with LBA state transition repository is added to the management area of the block serving as the object of the analysis in order to make the result of the search carried out at the step 1401 reusable. This is because the added file identifier indicates a file, the contents of which are recorded in a block found in the search carried out at the step 1401 as the block serving as the object of the analysis. After the step 1413 is ended, the PAD flow goes on to the step 1414. At the step 1414, the block serving as the object of the analysis is examined to determine whether or not the block is the last block for recording the end of the contents of a file. If the block serving as the object of the analysis is determined to be the last block for recording the end of the contents of a file, the PAD flow goes on to the step 1415. At the step 1415, a consistency flag is added to a management area of the block serving as the object of the analysis. The consistency flag is a flag indicating that the block serving as the object of the analysis is the last block for recording the end of the contents of a file. By identifying which block is used as the last block for recording the end of the contents of a file for each file in this way, it is possible to invalidate an operation to write data into a file of a storage medium in the disk drive in order to sustain consistency.

At the step 1420, the LBA state transition repository for managing only LBAs of blocks each used for storing contents of an unidentifiable file is examined to determine whether or not the LBA of the block serving as the object of the analysis has been cataloged in the LBA state transition repository. If the LBA of the block serving as the object of the analysis has not been cataloged in the LBA state transition repository for managing only LBAs of blocks each used for storing contents of an unidentifiable file, that is, if the LBA is a new LBA, the PAD flow goes on to the step 1421. If the LBA of the block serving as the object of the analysis has been cataloged in the LBA state transition repository for managing only LBAs of blocks each used for storing contents of an unidentifiable file, on the other hand, the PAD flow goes on to the step 1422. At the step 1421, a new LBA block entry for the value of an LBA specified in an operation carried out by the host to write data into the block serving as the object of the analysis is created in the LBA state transition repository for managing only LBAs of blocks each used for storing contents of an unidentifiable file. The new LBA block entry is used as an entry indicating that data has been newly recorded into the block serving as the object of the analysis. At the step 1422, information is added to a history of the existing LBA block entry of the LBA state transition repository for managing only LBAs of blocks each used for storing contents of an unidentifiable file. The information indicates a state in which the block serving as the object of the analysis has been updated. Then, at the next step 1423, a reference remark indicating an opposite direction is added to the existing LBA block entry of the LBA state transition repository for managing only LBAs of blocks each used for storing contents of an unidentifiable file. The opposite direction is a direction from the state added at the step 1422 to a preceding state. As described above, by collecting a history of operations to update data stored at an LBA not cataloged in meta information as an LBA block entry of an LBA state transition repository for managing only LBAs of blocks each used for storing contents of an unidentifiable file, it is possible to trace operations to write data into a block even for a case where contents of a file are saved before recording data in meta information and a case where an illegal access is made by bypassing the file system.

After the step 1410 is ended, the PAD flow goes on to the step 1202. At the step 1202, a seek operation to find the next block is carried out.

By referring to FIGS. 15 and 16, the following description explains a method to detect a falsification of a specific file. In accordance with the method to trace a history of write operations as described earlier by referring to FIGS. 11 to 14, data stored in the storage medium employed in a disk drive is analyzed by classifying write operations carried out on the data into directory operations and file operations. A falsification of a file is also detected at two levels, i.e., a directory-operation level and a file-operation level. In a process to detect a falsification at the directory-operation level, file renewal is checked. In a process to detect a falsification at the file-operation level, on the other hand, renewal of a data block for recording contents of a file is checked. All data necessary for determining whether or not a falsification exists has been collected in accordance with the method to trace a history of write operations as described earlier by referring to FIGS. 11 to 14. In processing represented by the PAD diagram of FIG. 15, a file is specified via the screen, which is shown in FIG. 16 as a screen of a console, as a file serving as the object of a falsification detection process and, then, the substance of a detected falsification is read out from a result of analyzing a history-tracing process and output to the screen of the console.

When the user enters the path name of an object of a falsification detection process to a path-name input portion 1601 of the console and then operates a command button 1602 of an analysis-result display area, at the step 1501 of the falsification detection method, the specified path name is input. When the step 1501 is ended, the PAD flow goes on to a step 1510.

At the step 1510, a loop is executed through analysis results of the method 1100 to trace a history of write operations in a reversed order from the most recent state of the file. The loop is effective in that, if a file has been falsified, the falsification can be detected by examining change points in the opposite direction from the most recent state of the file back to previous states thereof. The loop includes the step 1511 therein. At the step 1511, the write-operation history being processed is examined to determine whether or not the history agrees with the path name specified at the step 1501. If the history agrees with the path name, the PAD flow goes on to the step 1512. At the step 1512, the substance of an operation carried out on the specified file is fetched from the directory-operation history, which has been analyzed by the subroutine executed at the step 1130. The fetched substance of the operation can be typically a file creation, a file deletion or a file-name modification. After the step 1512 is ended, the PAD flow goes on to the step 1513. At the step 1513, the fetched substance of the operation is output to the console. After the loop executed at the step 1510 is ended, the PAD flow goes on to the loop executed at the step 1520.

In the loop executed at the step 1520, for every operation substance fetched in the loop executed at the step 1510, a write-operation history of a block for recording contents of the file is read out. By tracing the write-operation history of a block for recording contents of the file in this way, there is exhibited an effect that a falsification of the file in the disk drive can be detected even if the file has been falsified by a command issued by the host directly for a block device to the disk drive without going through the file system. The steps 1521, 1527 and 1528 of the loop of the step 1520 are executed as long as an operation substance fetched in the loop carried out at the step 1510 remains to be processed.

At the step 1521, a loop is executed for blocks each used for recording contents of a file specified by a file transition entry. The loop executed at the step 1520 is related to the loop executed at the step 1521 as below. In the loop executed at the step 1520, if an application saves a new file as an existing file after changing the file name of the existing file in an operation to save the new file, a file-tracing operation is carried out in a direction from the existing file to the new file. In the loop executed at the step 1521, on the other hand, renewals are traced for individual blocks each for recording contents of either the new file or the existing file. By referring to a history of file operations recorded in a file state transition repository after referring to operations in a history of directory operations recorded in a directory state transition repository in this way, there is exhibited the effect of an ability to trace updated contents of files even if one of the files replaces the other. The loop of the step 1521 includes the loop of the step 1522.

At the step 1522, a loop is executed in the reversed direction from the most recent state to a previous state on blocks, in which the host wrote data by specifying the same LBA. This loop comprises the steps 1523, 1524, 1525 and 1526. At the step 1523, the contents of a block serving as the object of the analysis are read out from the storage medium. Then, the PAD flow goes on to the step 1524. At the step 1524, contents stored previously in a block at the same LBA as the block serving as the object of the analysis are read out from the storage medium. Then, the PAD flow goes on to the step 1525. Then, at the step 1525, a difference in contents between the current block and the block experiencing a write operation previously is extracted. Then, the PAD flow goes on to the step 1526. At the step 1526, the fetched difference in contents between the two blocks is output to the console.

After the loop executed at the step 1521 is ended, the PAD flow goes on to the step 1527. Even if an existing file is deleted, being replaced by a new file, in accordance with the write-history trace method 1100, it is possible to trace both the existing and new files to determine which blocks of the two files are used for recording the contents of the files. Thus, at the step 1527, a difference at a file level between replaced and replacing files is extracted by using this function. After the step 1527 is ended, the PAD flow goes on to the step 1528. At the step 1528, the file difference extracted at the step 1527 is output to the console.

In order to display a plurality of extracted differences described above to the screen of the console, in addition to display areas for showing the differences, the screen also includes an area for specifying ones of the differences to be shown in the display areas. The meta-information difference display area 1603 displays a result output to the console at the step 1513. The directory-operation display area 1610 is used for selecting a directory-operation difference. The directory-operation display area 1610 comprises three columns, i.e., a type display column 1611 for showing the substance of each directory operation, an external-time display column 1612 for showing the external time of each directory operation and an internal-time display column 1613 for showing the internal time of each directory operation. To put it in more detail, the type display column 1611 shows the substance of each directory operation as a substance identified by the subroutine executed at the step 1130. The external-time display column 1612 shows a time of each directory operation. The time is propagated by a host to the disk drive and recorded in meta information. The internal-time display column 1613 shows the time it takes to carry out the write operation on the block recording meta information managed by the disk drive. When the user selects one of the operation substances shown in the type display column 1611 as a selected row 1614, a difference in meta information between the selected operation substance and an immediately preceding operation substance is displayed on the meta-information-difference display area 1603. The display area 1605 displays a difference at a file level between pre-operation meta information and post-operation meta information as a difference according to the selected row 1614.

The display area 1620 displays blocks each used for recording contents of a file, that is, blocks composing the file, when the user selects one of the operation substances shown in the type display column 1611 as a selected row 1614. To be more specific, for each of the blocks, the display area 1620 displays an LBA (Logical Block Address) specified by the host in the write operation and a PBA at which data of the write operation is actually stored in the storage medium employed in the disk drive. The LBA of each of the blocks used for recording contents of a file is shown on the display column 1621. The display column 1621 shows each LBA on one of as many rows as blocks each used for recording contents of the file. The host may have carried out a plurality of write operations by specifying the same LBA. In this case, the PBAs of blocks, in which pieces of data of the write operations specifying the same LBA were actually stored inside the storage medium employed in the disk drive, are displayed on the display column 1622. The display column 1622 is an LBA time-transient display column showing the PBA of each block used for recording contents of the file. The LBA time-transient display column 1622 comprises sub-columns each used for showing a PBA. The closer the sub-column to the right-end side, the more recent the write operation specifying a PBA shown on the sub-column. It is possible to determine whether or not data of any block has been falsified. That is to say, as indicated by a box 1623, a box on an LBA row can be selected as a file block, the data of which is examined to determine whether or not the data has been falsified. At the stage of selecting one of the operation substances, the block, into which data was most recently written, is selected. As a box 1623 is selected, a difference between the block represented by the selected box 1623 and a block selected immediately before is displayed on the block-difference display area 1604. By operating the block select clear button 1606, the selected box 1623 can be set back to the block selected immediately before. Then, if a data falsification is detected, a block to which the falsified block to be restored can be specified by as a selected box 1623 and, then, the falsified block can be restored to the state of the specified block by operating the command button 1607 for making a request for data invalidation. When the command button 1607 for making a request for data invalidation is operated, a data-invalidating command is supplied from the console to the disk drive. Receiving the data-invalidating command, the disk drive that writes data into the storage medium by execution of the WORM control invalidates data at PBAs lowers than the PBA indicated by the selected box 1623 in a PBA range from the highest PBA among blocks each having a consistency flag added thereto at the step 1317 to the highest PBA among blocks each completing a write operation.

As described above, a state of established consistency in the file system can be identified by referring to the state of the disk drive prior to falsification of data. Thus, there is exhibited an effect that, by merely invalidating only as little data as required, the disk drive can be restored to the state before the data falsification and the consistency of the file system can be maintained.

Next, a concrete example of the console display is explained by referring to FIGS. 24 and 25. FIG. 24 is a diagram showing the data structure of an LBA state transition repository provided for blocks specified in a file state transition repository. The data structures of the directory state transition and file state transition repositories of the second embodiment are the same as those of the first embodiment except that PBAs are each cataloged as data in the second embodiment, so that their explanations are not repeated.

To put it concretely, the data structure shown in FIG. 24 is different from that shown in FIG. 22 in that, in the case of the LBA state transition repository shown in FIG. 24, PBAs associated with LBAs are cataloged in place of values stored in flag areas associated with the LBAs. In the second embodiment, the disk drive executes WORM control. Thus, when data is written at an LBA of 3078, the data is actually stored at different PBAs of 8194 and 18964 as shown in the entries 2412 and 2413 respectively.

FIG. 25 is a diagram showing a concrete example of the console display. The internal-time display column 1613 displays an internal time, which is managed internally by the disk drive, for each operation substance. The external-time display column 1612 displays an external time for each operation substance. The external time is a timestamp at which the file system writes data into a file. In the row 2501, the internal time is an updated internal time while the external time is not an updated one, implying that it is quite within the bounds of possibility that data has been falsified. If the row 2501 is selected, the difference display area 1603 for meta information displays a difference in meta information between the row 2501 and a row immediately preceding the row 2501 and the display area 1620 displays the LBA of each block for recording contents of the file.

As the difference in meta information, the meta-information difference display area 1603 displays information with an unupdated timestamp and updated information of a block for recording contents of the file.

Since the PBA of an LBA changes from 8194 in the entry 2412 to 18964 in the entry 2413, a row for an LBA of 3078 in the LBA display unit 1620 for blocks displays two PBAs, i.e., the PBA of 8194 and the PBA of 18964. If one of the PBAs is specified as a selected box 1623, differences between the currently selected PBA and an immediately preceding PBA are displayed in the block-difference display area 1604 and the file-difference display area 1605. The display screen shown in FIG. 25 shows differences between the PBA of 8194 and the PBA of 18964 for the LBA of 3078 in the row 2502.

In the embodiment of the present invention, only file creations, file deletions and file-name modifications are regarded as directory operations and only an operation to add information on a block for recording contents of a file to meta information is regarded as the file operation. However, these operations can be extended with ease to include an operation to change a variety of attributes such as the time it takes to make an access to a file.

In the description of this embodiment, a method provided by the present invention is explained by taking the file system as an example. In addition to the file system, however, the method can be applied with ease to any other recording technique for saving data in a disk drive in a kind of data structure as is the case with a database.

In addition, this embodiment assumes that the analysis program is executed in a service processor or a controller employed in the disk drive. It is needless to say that the embodiment is not bound by this assumption. For example, the host connected to the disk drive may also execute the analysis program with ease provided that an access can be made to management information such as a write-operation history in the disk drive. On the top of that, this embodiment also assumes that the disk drive is implemented as a disk array having a large size. However, the embodiment can also be applied to a disk drive implemented as a single HDD as well.

The write method based on the WORM control is not limited to the technique of control of writing data in the order of physical block addresses. The write method based on the WORM control can also be adopted as a data-writing technique allowing a desired data-writing order to be specified as is the case of a technique adopted in an analysis.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A method for controlling a disk drive including a storage medium, and a control unit configured to exchange a command and data with a host and control operations to write and read data into and from the storage medium, said method comprising:
   providing a flag area for each unit of writing data into said storage medium as an area, to which said host is capable of only referring but into which only said control unit is capable of writing information, for every unit of an operation to write data into said storage medium;
   receiving a write command from said host;
   generating information changing to accompany execution of said write command based on internal information of said disk drive;
   writing said generated information into said flag area; and
   comparing the generated information with a previous state of the flag area to detect falsification.

2. A method for controlling a disk drive in accordance with claim 1, wherein, as said information changing to accompany execution of said write command, a total operating time of said disk drive is used.

3. A method for controlling a disk drive in accordance with claim 1, wherein, as said information changing to accompany execution of said write command, the total number of write commands issued to said disk drive is used.

4. A method for controlling a disk drive in accordance with claim 1, wherein, as said information changing to accompany execution of said write command, the total number of write commands issued to each writing unit of said storage medium is used.

5. A method for controlling a disk drive in accordance with claim 1, further comprising periodically scanning said storage medium and uses information read out at said scanning step as information based on internal information of said disk drive.

6. A disk drive including a storage medium and a control unit configured to exchange a command and data with a host and control operations to write data into the storage medium in accordance with said command received from said host as well as operations to read out data from said storage medium in accordance with said command received from said host, said disk drive comprising:
   a flag-area generation module configured to provide a flag area, to which said host is capable of only referring but into which only said disk drive is capable of writing information, for every unit of an operation to write data into said storage medium;
   an internal-state information generation module configured to generate internal-state information based on an internal state of said disk drive, said internal state changing to accompany execution of a write command; and
   an internal-state information write module configured to write internal-state information generated by said internal-state information generation module into said flag area provided by said flag-area generation module, whereby comparison of the changed internal state with a previous state of the flag area reveals falsification of data stored in the disk drive.

7. A disk drive according to claim 6, wherein a total operating time of said disk drive is used as said state, which changes to accompany execution of a write command.

8. A disk drive according to claim 6, wherein the number of write commands issued to said disk drive, is used as said state, which changes to accompany execution of a write command.

9. A disk drive according to claim 6, wherein the number of write commands issued to each writing unit of said storage medium is used as said state, which changes to accompany execution of a write command.

10. A disk drive according to claim 6, further comprising a scan mechanism to periodically scan said storage medium;
   wherein said internal-state information generation module uses a state changed by said scan module as said internal state.

* * * * *